(12) United States Patent
Harada et al.

(10) Patent No.: US 11,458,976 B2
(45) Date of Patent: Oct. 4, 2022

(54) VEHICLE CONTROL DEVICE

(71) Applicant: AISIN CORPORATION, Kariya (JP)

(72) Inventors: Shinya Harada, Kariya (JP); Satoshi Kokubo, Kariya (JP); Masaya Sugai, Kariya (JP); Hiroki Tsukada, Kariya (JP)

(73) Assignee: AISIN CORPORATION, Aichi (JP)

(*) Notice: Subject to any disclaimer, the term of this patent is extended or adjusted under 35 U.S.C. 154(b) by 3 days.

(21) Appl. No.: 17/209,565

(22) Filed: Mar. 23, 2021

(65) Prior Publication Data

US 2021/0300380 A1 Sep. 30, 2021

(30) Foreign Application Priority Data

Mar. 25, 2020 (JP) .............................. JP2020-054563

(51) Int. Cl.
*B60T 7/12* (2006.01)
*B60W 30/18* (2012.01)
*B60W 10/119* (2012.01)

(52) U.S. Cl.
CPC .... *B60W 30/18181* (2013.01); *B60W 10/119* (2013.01); *B60W 2520/105* (2013.01); *B60W 2520/40* (2013.01); *B60W 2710/1055* (2013.01)

(58) Field of Classification Search
CPC ......... B60W 30/18181; B60W 10/119; B60W 2520/105; B60W 2520/40; B60W 2710/1055
See application file for complete search history.

(56) References Cited

U.S. PATENT DOCUMENTS

| 2013/0035838 A1 | 2/2013 | Maier et al. |
| 2020/0369277 A1 | 11/2020 | Sugai et al. |
| 2021/0179056 A1* | 6/2021 | Park ..................... B60W 20/15 |

FOREIGN PATENT DOCUMENTS

| DE | 102016123071 A1 * | 6/2017 | ............. B60L 15/20 |
| JP | 2018057169 A | 4/2018 | |
| JP | 2020189547 A | 11/2020 | |
| WO | 2013035179 A1 | 3/2013 | |

OTHER PUBLICATIONS

The extended European Search Report dated Aug. 9, 2021, by the European Patent Office in corresponding European Patent Application No. 21165076.7-1012. (8 pages).

* cited by examiner

*Primary Examiner* — Adam M Alharbi
(74) *Attorney, Agent, or Firm* — Buchanan Ingersoll & Rooney PC

(57) ABSTRACT

A vehicle control device includes a control unit configured to obtain information relating to a drive state of a vehicle, calculate a requirement torque, compute a first target torque, a second target torque, and an ideal change rate of a total torque of the first drive torque and the second drive torque, and at least control a magnitudes of the first drive torque and the second drive torque outputted from the first drive unit and the second drive unit. The control unit is configured to control the first drive unit to operate a first zero-cross process and control the second drive unit to operate a second zero-cross process after the first zero-cross process ends.

11 Claims, 12 Drawing Sheets

VEHICLE CONTROL DEVICE

CROSS REFERENCE TO RELATED APPLICATIONS

This application is based on and claims priority under 35 U.S.C. § 119 to Japanese Patent Application 2020-054563, filed on Mar. 25, 2020, the entire content of which is incorporated herein by reference.

TECHNICAL FIELD

This disclosure generally relates to a vehicle control device.

BACKGROUND DISCUSSION

A known vehicle, especially such as a hybrid vehicle or a motor vehicle including a motor as a drive source operates a so-called zero-cross process, the process reducing the change rate of drive torque when the drive torque is included in a predetermined range including zero smaller than the change rate of the drive torque included in the other range to reduce noises or vibrations (oscillations) caused by contact noises of gears on a power transmission path when the drive torque changes from positive torque to negative torque (or from negative torque to positive torque).

Specifically, for example, according to PCT international publication number 2013/035179 (herein referred to as Patent reference 1), a technology includes a torque generation device generating the drive torque of the vehicle using the torque of the motor, and a control device operating the zero-cross process by controlling the torque generation device. When operating the zero-cross process, the control device sets an upper limit of the change rate for a power mode greater than an upper limit of the change rate for a non-power mode, the power mode in which the acceleration responsibility is expected to be greater than the non-power mode.

In Patent reference 1, for example, suppose the vehicle is mounted with the plural torque generation devices at the front and rear (or the right and left) of the vehicle (in a case where, for example, two of the torque generation devices are mounted on the vehicle, one of the torque generation devices controls front wheels of the vehicle, and the other of the torque generation devices controls rear wheels of the vehicle), as shown in FIG. 1, and when the control device controls the plural torque generation devices in the same manner, the control device operates the zero-cross processes for the front-wheel torque applied on the front wheels of the vehicle (Fr torque in FIG. 1) and for the rear-wheel torque applied to the rear wheels of the vehicle (Rr torque in FIG. 1) at substantially the same timing. In this case, even the zero-cross processes are operated for the front-wheel torque and rear-wheel torque, the switch timing of the negativity and positivity of the front-wheel torque and rear-wheel torque is substantially the same, and contact noises of the gears in accordance with the change of the reduced front-wheel torque and the contact noises of the gears in accordance with the change of the reduced rear-wheel torque occur at substantially the same time. As a result, noises and vibrations (oscillations) caused by the contact noises of the gears may occur.

A need thus exists for a vehicle control device which is not susceptible to the drawback mentioned above.

SUMMARY

According to an aspect of the disclosure, the vehicle control device includes a first drive unit configured to output a first drive torque to a first drive wheel, a second drive unit configured to output a second drive torque to a second drive wheel, and a control unit configured to obtain information relating to a drive state of a vehicle from a sensor group including at least an accelerator sensor and a brake sensor, calculate a requirement torque required by a driver of the vehicle based on the obtained information relating to the drive state of the vehicle, compute, after the calculation of the requirement torque, a first target torque relating to the first drive torque distributed based on the requirement torque, a second target torque relating to the second drive torque distributed based on the requirement torque, and an ideal change rate of a total torque of the first drive torque and the second drive torque in a first term from a first time point in which the driver performs an acceleration operation or a brake operation to a second time point in which the total torque reaches the requirement torque, and at least control a magnitude of the first drive torque outputted from the first drive unit in the first term and a magnitude of the second drive torque outputted from the second drive unit in the first term. In a case where the drive state of the vehicle shifts from a first drive state to a second drive state, the first drive state where the first drive torque and the second drive torque including a same sign of one of positivity and negativity are outputted at the first time point, the second drive state where the first drive torque including an opposite sign of the first drive torque in the first drive state and reaching the first target torque and the second torque including the opposite sign of the second drive torque in the first drive state and reaching the second target torque are outputted at the second time point, the control unit is configured to control the first drive unit to operate a first zero-cross process which makes a change rate of the first drive torque be equal to or smaller than a predetermined value in a case where the first drive torque is within a predetermined range including zero when the negativity and the positivity of the first drive torque switches through zero, and control the second drive unit to operate a second zero-cross process after the first zero-cross process ends, the second-zero process which makes a change rate of the second drive torque be equal to or smaller than the predetermined value in a case where the second drive torque is within the predetermined range when the negativity and the positivity of the second drive torque switches through zero.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
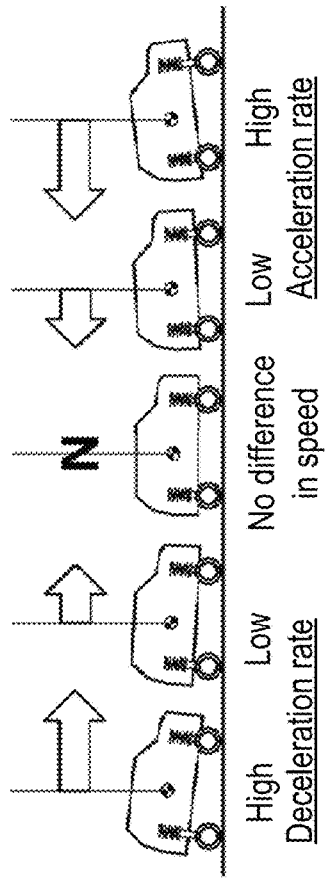
FIG. 1 is a characteristic diagram schematically illustrating a state where a front-wheel torque, a rear-wheel torque, and a total torque of the front and rear wheel torque change when a drive state of a vehicle changes from a decelerated state to an accelerated state by turning on an accelerator; and a known control method for setting a switch timing of positivity and negativity of the front-wheel torque and the rear-wheel torque to be substantially the same.
Figure 1:
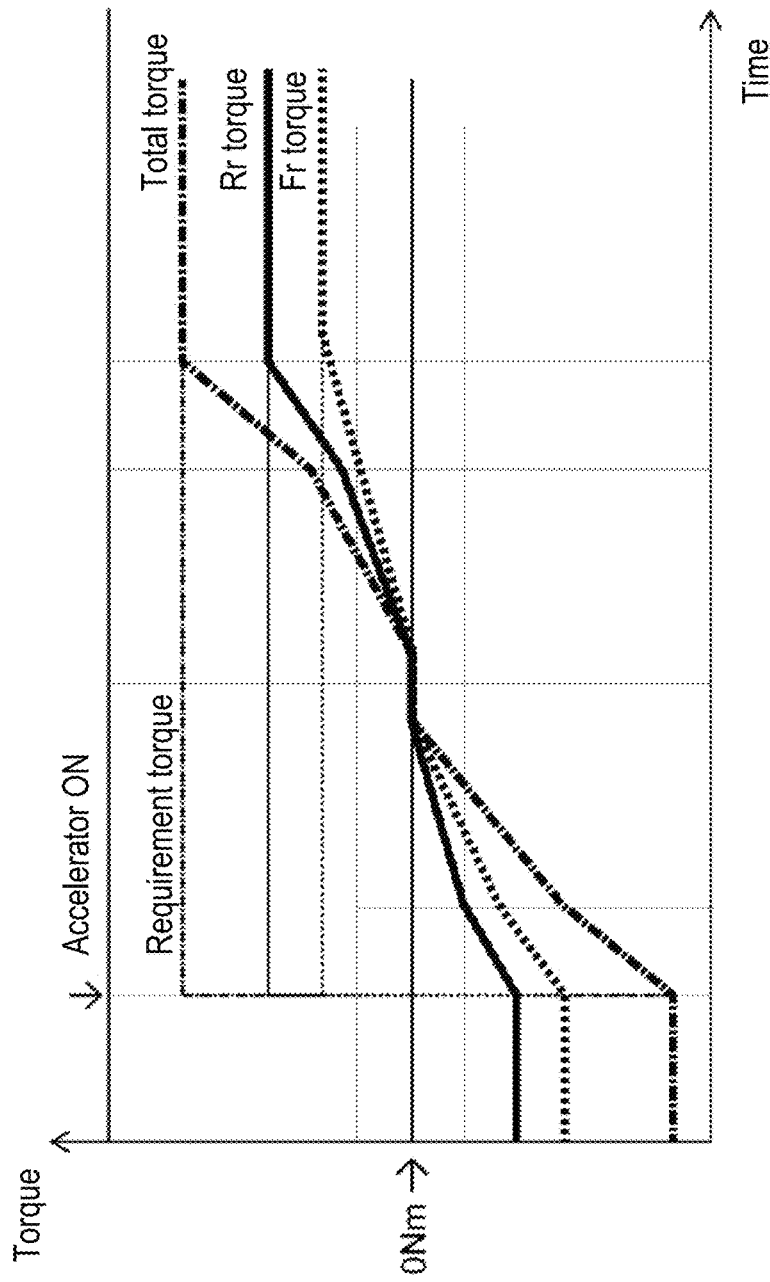

An embodiment will hereunder be explained with reference to the attached drawings.

Components which are common in the drawings are shown with the same reference numeral. The components shown in one figure may not be illustrated in the other figures for the convenience of explanation. The magnification of the figures is not necessarily illustrated in a precise manner. The schematic diagram illustrated above in FIG. 1 to FIG. 11 (except for FIGS. 2 and 9) shows the posture or position of a vehicle in response to each state (each time), and the inertia of the vehicle or the gradient of a road surface are not considered.

1. A configuration of a vehicle on which a vehicle control device is mounted: A summary of a vehicle on which a vehicle control device of the embodiment is mounted will hereunder be explained with reference to FIG. 2.

A vehicle 1 as an example of the embodiment mainly includes a left-front wheel 2, a right-front wheel 3, a left-rear wheel 4, a right-rear wheel 5, a first drive unit 10, a second drive unit 20, a first gear box 12, a first drive shaft 14, a second gear box 22, a second drive shaft 24, a brake device 30, a steering mechanism 40, an electronic control buffer 50, an accelerator sensor 60, a brake sensor 61, a wheel speed sensor 62, a steering angle sensor 63, an acceleration sensor 64, and a control unit 100. The first drive unit 10 outputs a first drive torque to the left-front wheel 2 and the right-front wheel 3. The second drive unit 20 outputs a second drive torque to the left-rear wheel 4 and the right-rear wheel 5. The first gear box 12 and the first drive shaft 14 transmit the first drive torque outputted from the first drive unit 10 to the left-front wheel 2 and the right-front wheel 3. The second gear box 22 and the second drive shaft 24 transmit the second drive torque outputted from the second drive unit 20 to the left-rear wheel 4 and the right-rear wheel 5. The steering mechanism 40 steers the left-front wheel 2 and the right-front wheel 3. The accelerator sensor 60 detects the opening of an accelerator pedal. The brake sensor 61 detects a position of a master cylinder in the brake device 30. The wheel speed sensor 62 detects at least one of the wheel speed (speed of the vehicle) of the left-front wheel 2, the right-front wheel 3, the left-rear wheel 4, and the right-rear wheel 5. The steering angle sensor 63 detects a steering angle of the steering mechanism 40. The acceleration sensor 64 detects the acceleration of the vehicle 1. A vehicle control device 500 of the disclosure includes the first drive unit 10, the second drive unit 20, and the control unit 100.

Figure 2:
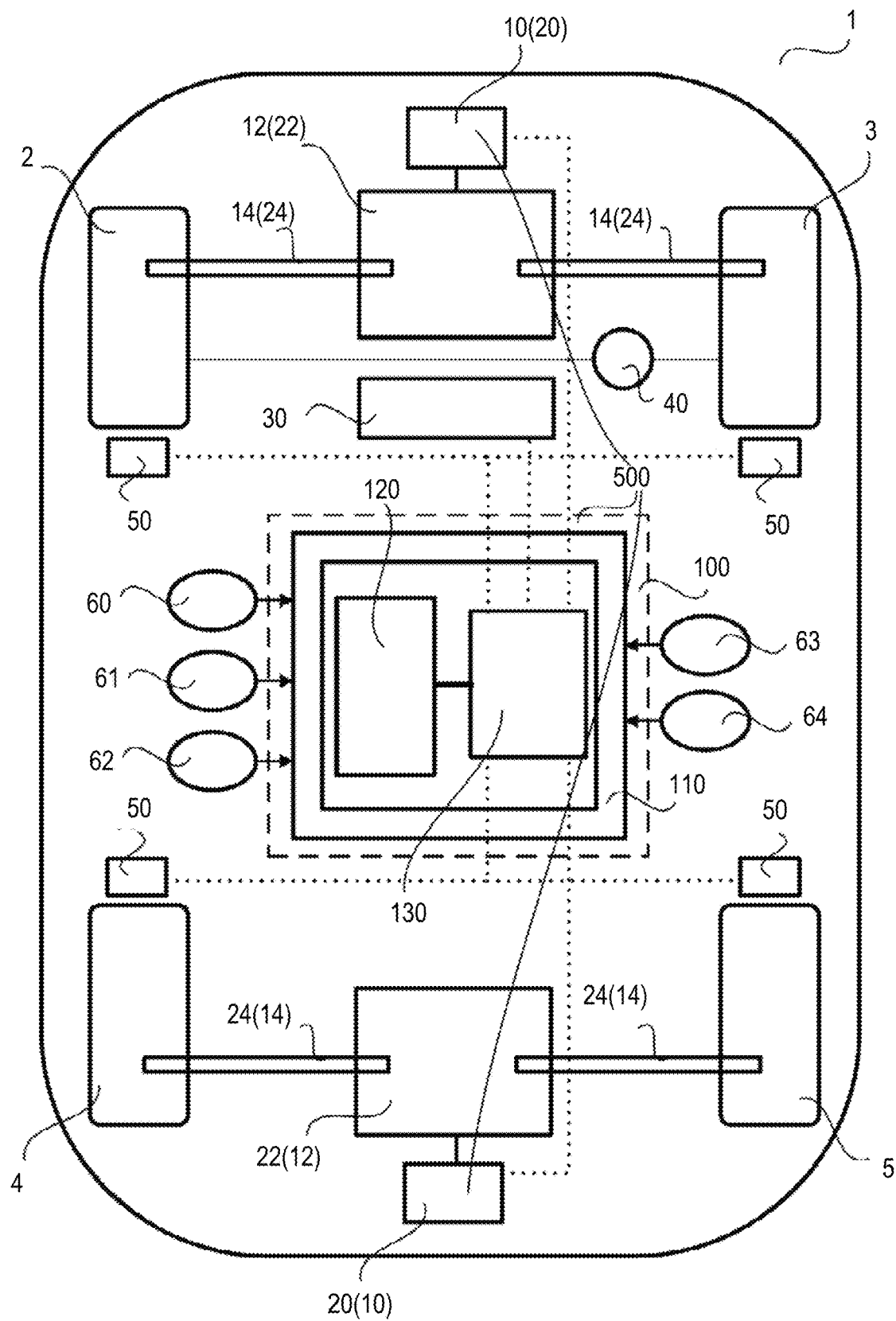
FIG. 2 is a block diagram schematically illustrating a configuration of an example of the vehicle on which a vehicle control device of an embodiment is mounted.

The vehicle 1 shown in FIG. 2 is configured by two drive units which are the first drive unit 10 outputting the first drive torque to the left-front wheel 2 and the right-front wheel 3 (also collectively referred to as a first drive wheel in the disclosure), and the second drive unit 20 outputting the second drive torque to the left-rear wheel 4 and the right-rear wheel 5 (also collectively referred to as a second drive wheel in the disclosure), which is not limited as above. Alternatively, the vehicle 1 may include four drive units which drive the left-front wheel 2, the right-front wheel 3, the left-rear wheel 4 and the right-rear wheel 5 individually. In this case, four gear boxes in total may be provided for the four drive units, respectively.

In the vehicle 1 shown in FIG. 2, the first drive unit 10 is configured to output the first drive torque to the front wheels (the left-front wheel 2 and the right-front wheel 3) and the second drive unit 20 is configured to output the second drive torque to the rear wheels (the left-rear wheel 4 and the right-rear wheel 5), which is not limited as above. Alternatively, the first drive unit 10 may output the first drive torque to the rear wheels and the second drive unit 20 may output the second drive torque to the front wheels (each of the reference numerals 10 and 20 is shown with a bracket in FIG. 2). Furthermore, the first drive unit 10 may output the first drive torque to left wheels (the left-front wheel 2 and the left-rear wheel 4), and the second drive unit 20 may output the second drive torque to right wheels (the right-front wheel 3 and the right-rear wheel 5). (In this case, the left-front wheel 2 and the left-rear wheel 4 are collectively referred to as a first drive wheel, and the right-front wheel 3 and the right-rear wheel 5 are collectively referred to as a second drive wheel.) Each of the first drive unit 10 and the second drive unit 20 may use, for example, a motor.

The vehicle 1 shown in FIG. 2 may be mounted with other sensors such as a vehicle height sensor and a shift position sensor in addition to the aforementioned sensors. In a case where the vehicle 1 does not include an accelerator pedal, the accelerator sensor 60 may be provided at another means substituting an accelerator pedal.

Each of the first gear box 12 and the second gear box 22 is a gear mechanism including plural gears such as a known planetary gear mechanism. As described above, in a case where the first drive unit 10 outputs the first drive torque to the rear wheels, and the second drive unit 20 outputs the second drive torque to the front wheels, the first gear box 12 shall transmit the first drive torque to the left-rear wheel 4 and the right-rear wheel 5, and the second gear box 22 shall transmit the second drive torque to the left-front wheel 2 and the right-front wheel 3.

The control unit 100 mounted on the vehicle as an example of the embodiment mainly includes a receiver 110, a calculation unit 120, and an output unit 130. The receiver 110 obtains (receives) information relating to a drive state of the vehicle 1 from the sensors. The calculation unit 120 operates calculations based on the various information obtained (received) by the receiver 110. The output unit 130 outputs the information calculated by the calculation unit 120 to at least the first drive unit 10, the second drive unit 20, the brake device 30, and the electronic control buffer 50. The configuration of the control unit 100 is not limited to that the single receiver 110, the single calculation unit 120, and the single output unit 130 are provided, and each of them may be separated multiply and integrally controlled.

2. A basic calculation and computation process performed by the control unit 100: Next, a basic calculation and computation process performed by the control unit 100 will hereunder be explained.

The receiver 110 of the control unit 100 obtains (receives) the information relating to the drive state of the vehicle 1 from such as the accelerator sensor 60, the brake sensor 61, the wheel speed sensor 62, the steering angle sensor 63, and the acceleration sensor 64 (also collectively referred to as a sensor group). In particular, the receiver 110 receives the information relating to the acceleration opening (the acceleration operation amount) operated by the driver of the vehicle 1. Similarly, the receiver 110 receives the information relating to the brake operation amount from the brake sensor 61, the wheel speed (the speed of the vehicle) from the wheel speed sensor 62, the steering angle from the steering angle sensor 63, and the acceleration speed of the vehicle 1 from the acceleration sensor 64. The receiver 110 may receive various information relating to the drive state of the vehicle 1 from other sensors in a case where the vehicle 1 includes other sensors in addition to the sensor group. The receiver 110 transmits the information relating to the drive state of the vehicle 1 received from the sensors to the calculation unit 120.

Next, the calculation unit 120 calculates a requirement torque in which the driver and/or each of the control devices of the vehicle 1 requires to the vehicle 1 (the control unit 100) based on, for example, a predetermined map or a predetermined calculation formula using the information and a value as a parameter, the various information relating to the drive state of the vehicle 1 received by the receiver 110, especially the acceleration opening, the brake operation amount, and the speed of the vehicle 1 (the value received by the receiver 110) and the values of the first drive torque and the second drive torque outputted by the first drive unit 10 and the second drive unit 20, respectively, at a first time point in which the acceleration operation (and/or the brake operation) of the vehicle 1 is operated by the driver and/or the control devices mounted to achieve the drive support or the automatic driving operation. In particular, in a case where the driving state of the vehicle 1 shifts from the decelerated state to the accelerated state, the calculation unit 120 mainly calculates the requirement torque based on the information relating to the acceleration opening and the speed of the vehicle and on the values of the first and second drive torque at the time point in which the accelerator pedal is operated by the driver and/or the aforementioned control devices.

Next, the calculation unit 120 calculates a first target torque relating to the first drive torque and a second target torque relating to the second drive torque which are divided ideally based on the calculated requirement torque to stabilize the position or the posture of the vehicle 1 receiving the effect of the requirement torque.

A formula 1 is: $Wf=W \times Lr/L - W \times \alpha \times H/g/L$

A formula 2 is: $Wf=W \times Lr/L + W \times \alpha \times H/g/L$

A formula 3 is: $TQx=TQ \times Wr/(Wf+Wr)$

A formula 4 is: $TQy=TQ \times Wr/(Wf+Wr)$

In the formula 1, Wf is a front-wheel weight, W is a weight of a center point of the vehicle 1, L is a wheelbase, Lr is a distance to a center of the left-rear wheel 4 (or the right-rear wheel 5) of the vehicle 1 from the center point of the vehicle 1. $\alpha$ is a target acceleration speed calculated by the requirement torque, H is a height of the center point of the vehicle 1, and g is an acceleration of gravity.

In the formula 2, Wr is a rear-wheel weight, Lf is a distance to a center of the left-front wheel 2 (or the right-front wheel 3) from the center point of the vehicle 1.

In the formulas 1 and 2, the moments of center points of contact points of tyres or tires are considerably balanced, the tyres such as the left-front wheel 2, the right-front wheel 3, the left-rear wheel 4, and the right-rear wheel 5.

In formula 3, TQx is the first target torque, and TQ is the requirement torque. In formula 4, TQy is the second target torque. The formulas 3 and 4 are based on the premise that the first drive torque is outputted to the rear wheels and the second drive torque is outputted to the front wheels. In a case where the first drive torque is outputted to the front wheels and the second drive torque is outputted to the rear wheels, TQx is the second target torque and TQy is the first target torque.

Next, the calculation unit 120 calculates an ideal change rate of a total torque (the ideal change rate as a change amount per time of the total torque in a case where the time is illustrated in a horizontal axis and the magnitude of the total torque is illustrated in a vertical axis) in a term (a first term) from the first time point to a second time point, the first time point in which the driver or the control devices operate the acceleration operation (or the brake operation), the second time point in which the total torque of the first and second drive torque reaches the requirement torque (the first drive torque reaches the first target torque, and the second drive torque reaches the second target torque). The ideal change rate of the total torque is determined in consideration of such as the characteristics of the vehicle 1, the speed of the vehicle at the first time point, the characteristics of the first drive unit 10, and the characteristics of the second drive unit 20. (Specifically, it is favorable that a map relating to the ideal change rate and a calculation formula determining the ideal change rate are prepared at a compatible operation in advance.)

3. The control of the first and second drive torque operated by the control unit: The control unit 100 (the calculation unit 120) controls the magnitude of the first drive torque outputted by the first drive unit 10 and the magnitude of the second drive torque outputted by the second drive unit 20 in the first term with reference to the first target torque, the second target torque and the ideal change rate of the total torque calculated or computed as above. Hereinafter the details of the control relating to the first drive torque and the second drive torque operated by the control unit 100 will be explained.

Figure 3:
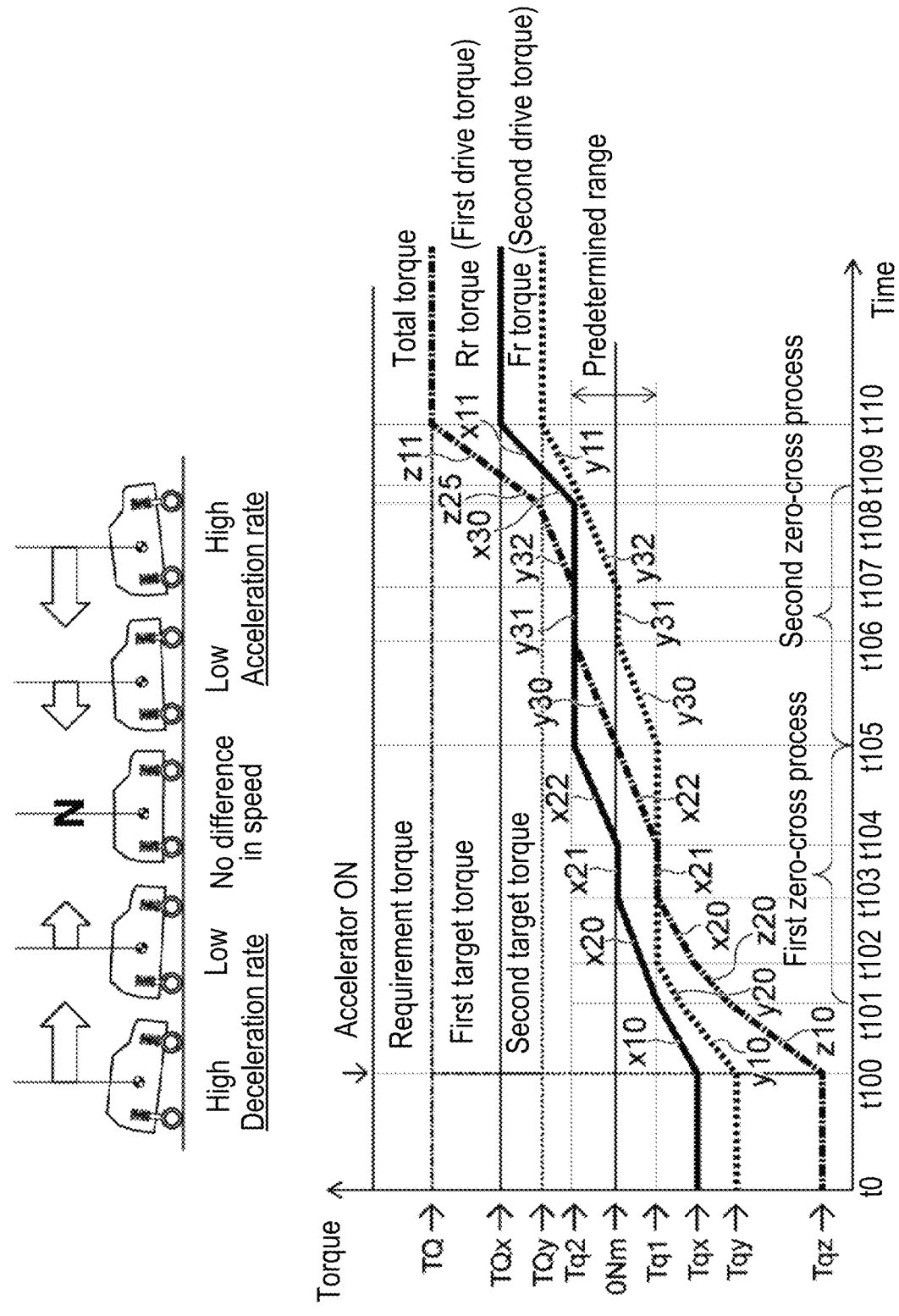
FIG. 3 is a characteristic diagram illustrating a first pattern in which a first drive torque and a second drive torque are controlled and changed by a control unit of the vehicle control device of the embodiment in a case where the drive state of the vehicle changes from the decelerated state to the accelerated state.

3-1: A first pattern: The details of the control of a first pattern with respect to the first and second drive torque operated by the control unit 100 will be explained with reference to FIG. 3. In FIG. 3, the first drive unit 10 outputs the first drive torque to the rear wheels (the left-rear wheel 4, and the right-rear wheel 5 in FIG. 2), and the second drive unit 20 outputs the second torque to the front wheels (the left-front wheel 2, the right-front wheel 3 in FIG. 2).

As shown in FIG. 3, at a time t100 (the first time point), the drive state of the vehicle 1 is in the decelerated state (a first drive state), and the first and second drive torque which are negative torque are outputted by the first and second drive units 10, 20, respectively. A total torque TQz (Tqx+Tqy) at the time t100 is naturally the negative torque. When the acceleration operation is performed by the driver and/or the control devices at the time t100 when the vehicle 1 is in the decelerated state, the control unit 100 (the calculation unit 120) calculates a requirement torque TQ based on the information relating to the acceleration opening and the speed of the vehicle, the value of first drive torque (Tqx) and the value of second drive torque (Tqy) at the time t100 when the operation for the accelerator pedal is operated.

Next, the calculation unit 120 calculates the first target torque TQx and the and second target torque TQy based on the calculated requirement torque TQ and the formulas 1 to 4 at the time t100 (the first time point). The calculation unit 120 calculates an ideal change rate z10 of the total torque by the aforementioned method.

The calculation unit 120 controls the first drive unit 10 and the second drive unit 20 to change the first drive torque and the second torque at an appropriate change rate as the time goes by based on the calculated or computed requirement torque TQ, first target torque TQx, second target torque TQy, and the ideal change rate z10 of the total torque Specifically, as shown in FIG. 3, the first drive torque (also referred to as Rr torque in FIG. 3) is gradually changed to reach the first target torque TQx, the second drive torque (also referred to as Fr torque in FIG. 3) is gradually changed to reach the second target torque TQy, in a term from the time t100 to a time t101. The summation of a change rate x10 of the first drive torque and a change rate y10 of the second drive torque is the ideal change rate z10 to maintain the ideal change rate z10 of the total torque from the time t100 to the time t101. At the same time, in the term from the time t100 to the time t101, (the change rate x10 of) the first drive torque and (the change rate y10 of) the second drive torque are maintained to include an ideal distribution ratio with respect to the first drive torque and the second drive torque in accordance with the predetermined maps and formulas on the position control of the vehicle. The position control of the vehicle is configured to calculate continually the ideal distribution ratio (the ideal distribution ratio with respect to the first drive torque and the ideal distribution ratio with respect to the second drive torque) in accordance with the actual torque of the real time by the similar formulas of the aforementioned formulas 1 to 4 based on the information of the real torque of the real time (which is the same meaning as the total torque of the real time and for example, corresponds to the total torque Tqz at the time t100 as the real time) and the speed of the vehicle at the real time.

Next, the calculation unit 120 controls the first drive unit 10 via the output unit 130 to operate (start) the first zero-cross process in which the change rate of the first drive torque is set equal to or less than a predetermined value when the first drive torque reaches a first predetermined torque Tq1 at the time t101. In particular, the calculation unit 120 operates the control setting the upper limit of the change rate of the first drive torque to be a predetermined value when (as a turning point in which) the first drive torque reaches the first predetermined torque Tq1. Thus, as shown in FIG. 3, a change rate x20 of the first drive torque after the time t101 changes to be smaller than the change rate x10.

Meanwhile, the first zero-cross process operates when the first drive torque is within a predetermined range at a time point in which the positivity and the negativity of the first drive torque switches through zero (0 Nm). Similarly, the second zero-cross process operates when the second drive torque is within a predetermined range at a time point in which the positivity and the negativity of the torque of the second drive torque switches through zero (0 Nm). The description that the first drive torque is within the predetermined range means that the first drive torque is smaller than an absolute value of a predetermined torque. Similarly, the description that the second drive torque is within the predetermined range means that the second drive torque is smaller than an absolute value of a predetermined torque. That is, as shown in FIG. 3, the first drive torque (the second drive torque) is within the range between the first predetermined torque Tq1 specified on the negative side and a second predetermined torque Tq2 specified on the positive side (strictly speaking, the first predetermined torque Tq1 and the second predetermined torque Tq2 are not included in the predetermined range because they are threshold values of the predetermined range). As shown in FIG. 3, the absolute values of the first predetermined torque Tq1 and the second predetermined torque Tq2 may be the same or may be different from each other (including a case where the absolute value of the first predetermined torque Tq1 is smaller than the absolute value of the second predetermined torque Tq2, and a case where the absolute value of the first predetermined torque Tq1 is greater than the absolute value of the second predetermined torque Tq2). FIG. 3 shows an example of a case where the first predetermined torque Tq1 and the second predetermined torque Tq2 are commonly applied to the first drive torque and the second drive torque, respectively. Alternatively, the first predetermined torque Tq1 and the second predetermined torque Tq2 may be specified or set with respect to the first drive torque in accordance with the difference of the drive characteristics of the first drive unit 10 and the second drive unit 20, and a third predetermined torque Tq3 and a fourth predetermined torque Tq4 which are different from the first predetermined torque Tq1 and the second predetermined torque Tq2 may be exclusively specified or set with respect to the second drive torque. In this case, the absolute values of the third predetermined torque Tq3 and the fourth predetermined torque Tq4 may be the same or different from each other.

Thus, as shown in FIG. 3, the first zero-cross process is operated for the term from the time t101 when the first drive torque reaches the first predetermined torque Tq1 (a third time point) to the time t105 when the first drive torque reaches the second predetermined torque Tq2. As shown in FIG. 3, the first zero-cross process is operated to make the change rate of the first drive torque be at a smallest rate x21 which is close to zero for a predetermined time (from a time t103 to a time t104 in FIG. 3) to keep or maintain the term (time) when the first drive torque reaches zero (0 Nm) for a while so as to minimize the occurrence of noises or vibrations (oscillations) due to a backrush at the first gear box 12.

As described above, the change rate of the first drive torque changes from x10 to x20 (from the time t101 to the time t103) or x22 (from the time t104 to the time t105) at the time t101 in accordance with the start of the first zero-cross process from the time t101. (X20 and x22 may be the same value and different values, that is, x10 is greater than x20 and x10 is greater than x22.) The calculation unit 120 changes the change rate of the second drive torque from y10 to y20 (y10 is greater than y20) in accordance with that the change rate of the first drive unit 10 changes from x10 to x20 to maintain (the change rate x10 of) the first drive torque and (the change rate y10 of) the second drive torque at the ideal distribution ratio from the time t101 to the time t102, similar to from the time t100 to the time 101, the ideal distribution ratio which is in accordance with the predetermined map and/or formula on the position control of the vehicle. Accordingly, the change rate of the total torque changes from the ideal change rate z10 to z20 at the time t101. That is, the calculation unit 120 allows that the ideal change rate of the total torque does not maintain at the time t101 (from the time t101 to the time t102).

Next, as described above, when the second drive torque reaches the first predetermined time Tq1 at the time t102 during the first zero-cross operation with respect to the first drive torque, the calculation unit 120 operates a guard control making the change rate of the second drive torque be zero forcibly (to maintain the second drive torque at the first predetermined torque Tq1) so as not to operate the second zero-cross operation with respect to the second drive torque (so as not to include the second drive torque in the predetermined range). The guard control allows the second zero-cross process to operate immediately after the end of the first zero-cross process while inhibiting the second zero-cross process from operating during the first zero-cross process.

In connection with that the change rate of the second drive torque maintains zero from the time t102 to the time t105 when the first zero-cross operation ends (a fourth time point), the calculation unit 120 prioritizes the first and second zero-cross processes by allowing that the ideal change rate of the total torque is not maintained from the time t102 to the time t105 similarly to the term from the time t101 to the time t102. The change rate of the total torque from the time t102 to the time t105 is the same as the change rate x20, x21 or x22 of the first drive torque during the first zero-cross process because the change rate of the second torque is zero.

Next, the first zero-cross process ends when the first drive torque in which the first zero-cross process is operated reaches the second predetermined torque Tq2 at the time t105. At the same time, the second drive unit 20 is controlled via the output unit 130 to operate (start) the second zero-cross process to make the change rate of the second drive torque equal to or smaller than the predetermined rate with respect to the second drive torque which is maintained at the first predetermined torque Tq1. Thus, the change rate of the second drive torque changes from zero to y30 (from the time t105 to a time t106) or y32 (from a time t107 to a time t108) at the time t105. (y30 and y32 may be the same value or different values). The change rate y30 of the second drive torque from the time t105 to the time t106 may be the same as the change rate x20 of the first drive torque from the time t101 to the time t103, or different therefrom. Similarly, the change rate y32 of the second drive torque from a time t107 to a time t108 may be the same as the change rate x22 of the first drive torque from the time t104 to the time t105, or different therefrom.

As shown in FIG. 3, the second zero-cross process is operated to, similarly to the first zero-cross process, make the change rate of the second drive torque be at a smallest rate y31 which is close to zero fora predetermined time (from the time t106 to the time t107 in FIG. 3) to keep the term (time) when the second drive torque reaches zero (0 Nm) for a while so as to minimize the occurrence of noises or vibrations (oscillations) due to the backrush at the second gear box 12. The change rate y31 of the second drive torque from the time t106 to the time t107 may be the same as the change rate x21 of the first drive torque from the time t1103 to the time t1104, or different therefrom.

Meanwhile, the change rate of the first drive torque in which the first zero-cross process ends maintains or keeps at the second predetermined torque Tq2 (the change rate is zero) from the time t105 when the second zero-cross process is operated with respect to the second drive torque to a time t108 immediately before the end of the second zero-cross process. Then, in a time t108 to a time t109, similarly to the term from the time t101 to the time t102, the calculation unit 120 changes the change rate of the first drive torque from zero to x30 with reference to the change rate y32 of the second drive torque during the same term so as to maintain again (the change rate x30 of) the first drive torque and (the change rate y32 of) the second drive torque at the ideal distribution ratio according to the predetermined map and/or formula on the position control of the vehicle. Accordingly, the calculation unit 120 allows that the ideal change rate of the total torque does not maintain, and make the change rate of the total torque for the same term (from the time t108 to the time t109) different from the ideal change rate z10, which is z25.

After a time t109 when the second zero-cross process ends (from the time t109 to a time t110), the calculation unit 120 controls, similarly to the term from the time t100 to the time t101, the first drive unit 10 and the second drive unit 20 to make the change rate of the first drive torque be x11, and the change rate of the second drive torque be y11 from the time t109 to the time t110 to maintain the ideal change rate z11 of the total torque. The ideal change rate z11 of the total torque after the time t109 may be the same as the ideal change rate z10 of the total torque from the time t100 to the time t101, or different therefrom. The change rate x11 of the first drive torque after the time t109 may be the same as or different from the change rate x10 of the first drive torque from the time t100 to the time t101, and similarly, the change rate y11 of the second drive torque after the time t109 may be the same as or different from the change rate y10 of the second drive torque from the time t100 to the time t101 in accordance with the relation between the ideal change rates z10 and z11. Similarly to from the time t100 to the time t101, the ideal distribution ratio is maintained for (the change rate x30 of) the first drive torque and (the change rate y32 of) the second drive torque at the term from the time t109 to the time t110 in accordance with the predetermined map and/or formula on the position control of the vehicle.

Finally, the first drive torque reaches the first target toque TQx and the second drive torque reaches the second target toque TQy at the time t110. At the same time, the total torque reaches the requirement torque TQ. As such, the shift of the drive state of the vehicle 1 ends from the decelerated state (the first drive state) at the time t100 (the first time point) to the accelerated state (the second drive state) at the time t110 (the second time point). As shown in FIG. 3, the first drive unit 10 and the second drive unit 20 output the first drive torque and the second drive torque which are negative torque at the time t100 (the first time point). Meanwhile, the drive state of the vehicle 1 is in the accelerated state (the second drive state) at the time t110 (the second time point), as shown in FIG. 3, the first drive unit 10 and the second drive unit 20 output the first drive torque and the second drive torque which are positive torque which is the opposite sign of the negative torque. The total torque (the requirement torque TQ) at the time t100 is naturally the positive torque.

As described above, in the first pattern, the first and second zero-cross processes may be operated in the different timing, and therefore, as a whole of the vehicle control device, the noises or the vibrations (oscillations) may be efficiently reduced.

Figure 4:
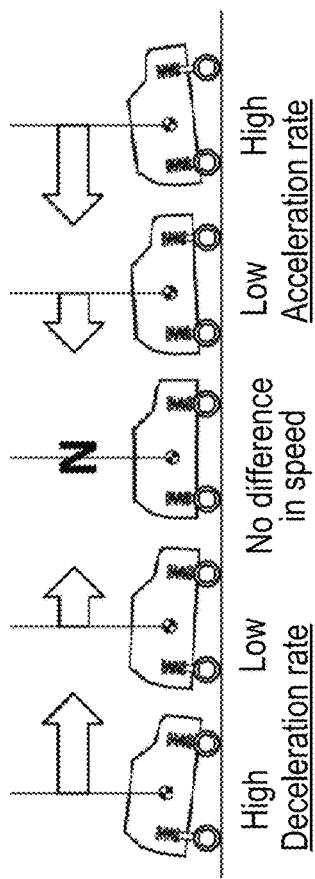
FIG. 4 is a characteristic diagram illustrating a second pattern in which the first drive torque and the second drive torque are controlled and changed by the control unit of the vehicle control device of the embodiment in a case where the drive state of the vehicle changes from the decelerated state to the accelerated state.
Figure 4:
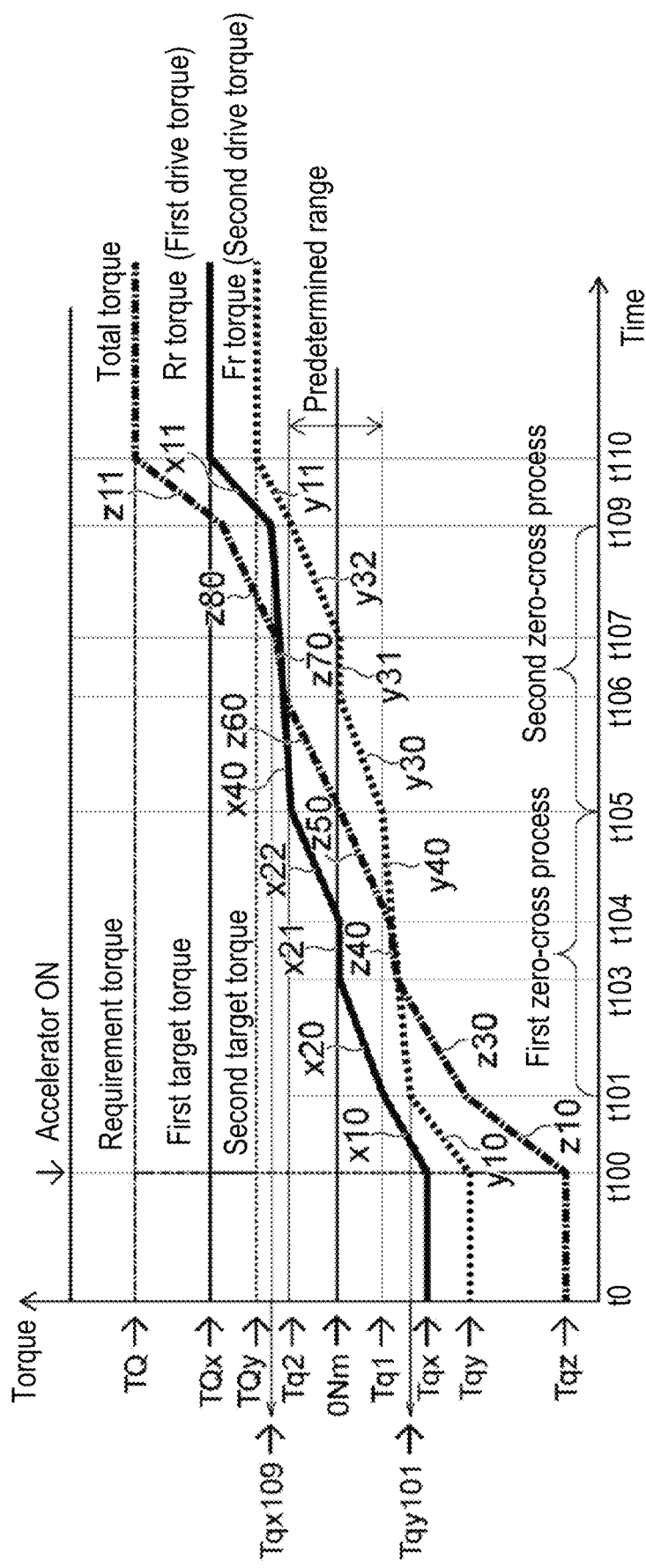

3-2: A second pattern: The details of the control of a second pattern with respect to the first and second drive torque operated by the control unit 100 will be explained with reference to FIG. 4. In FIG. 4, similarly to FIG. 3, the first drive unit 10 outputs the first drive torque to the rear wheels (the left-rear wheel 4, and the right-rear wheel 5 in FIG. 2), and the second drive unit 20 outputs the second torque to the front wheels (the left-front wheel 2, the right-front wheel 3 in FIG. 2).

The second pattern operated by the control unit 100 is basically the same as the above-described first pattern, however, the change rate of the second drive torque from the time t101 to the time t102 in the first pattern is different from the change rate y20 of the first pattern. In the second pattern, the change rate of the first drive torque from the time t105 to the time t09 is different from the change rates of the first drive torque, zero and x30, of the first pattern. Other than that, the second pattern is the same as the first pattern. The details of the second pattern different from the first pattern will hereunder be explained.

As shown in FIG. 4, in the second pattern, the change rate of the second drive torque after the time t101 is smaller than the change rate y20 of the first pattern, which is y40.

It is important that the second drive torque reaches the first predetermined torque Tq1 to start the second zero-cross process immediately at the time t105 when the first zero-cross process ends at the latest. Conversely speaking, the second drive torque may have only to reach a predetermined Tqz1 at the time t105. Thus, for example, at the time t101 (the third time point) when the first zero-cross process starts, the calculation unit 120 may estimate the time t105 (a fourth time point) when the first zero-cross process ends with reference to the change rates of the first drive torque x20, x21 and x22, and control to use the change rate y40 gained by the division of the difference between a second drive torque Tqy101 and the first predetermined torque Tq1 at the time t101 (Tq1−Tqy101) by a time from the time t101 to the estimated time t105 (the time t105−the time t101) as the change rate of the second drive torque. The change rate of the total torque from the time t101 to the time t105 does not maintain the ideal change rate z10, and is the summation of the change rates x20, x21, and x22 of the first drive torque and the change rate y40 of the second drive torque. That is, the change rate of the total torque from the time t101 to the time 103 is z30 which is the summation of the change rate x20 of the first drive torque and the change rate y40 of the second drive torque. The change rate of the total torque from the time t103 to the time 104 is z40 which is the summation of the change rate x21 of the first drive torque and the change rate y40 of the second drive torque. The change rate of the total torque from the time t104 to the time 105 is z50 which is the summation of the change rate x22 of the first drive torque and the change rate y40 of the second drive torque.

Next, as shown in FIG. 4, in the second pattern, the change rate of the first drive torque from the time t105 to the time t109 is x40 which is different from the change rates of the first pattern, which are zero and x30.

It is sometimes favorable for the first drive torque after the end of the first zero-cross process to reach the first target torque as soon as possible according to the performance expected for the vehicle 1 or the preferences of the user. Thus, as explained in the first pattern, it may be favorable for the change rate of the first drive torque to apply a predetermined change rate rather than maintaining the change rate of the first drive torque zero after the first zero-cross process ends. In the second pattern, the change rate of the first drive torque from the time t105 to the time t109 is x40 which is smaller than x30. Here, the change rate x40 of the first drive torque may be the same as the aforementioned y40 or different therefrom. In a case where the change rate x40 of the first drive torque is set different from the y40, for example, the calculation unit 120 firstly estimates a time t109 when the second zero-cross process ends with reference to the change rates y30, y31, and y32 of the second drive torque at the time t105 when the second zero-cross process starts. Then, the calculation unit 120 may estimate a target value (Tqx109) of the first drive torque at the time t109 based on that the second drive torque is Tq2 at the time t109, and that the ideal distribution ratio according to the predetermined map and/or the formula on the position control of the vehicle is applied at the time t109, and use x40 gained by the division of the difference between the Tqx 109 and the first drive torque Tq2 at the time t105 (Tqx109−Tq2) by the time from the time t105 to the estimated time t109 (time t109−time t105) as the change rate of the first drive torque.

The change rate of the total torque from the time t105 to the time t109 does not maintain the ideal change rate z10 (or z11), and is the summation of the change rate x40 of the first drive torque and the change rates y30, y31, and y32 of the second drive torque. That is, the change rate of the total torque from the time t105 to the time 106 is z60 which is the summation of the change rate x40 of the first drive torque and the change rate y30 of the second drive torque. The change rate of the total torque from the time t106 to the time 107 is z70 which is the summation of the change rate x40 of the first drive torque and the change rate y31 of the second drive torque. The change rate of the total torque from the time t107 to the time 109 is z80 which is the summation of the change rate x40 of the first drive torque and the change rate y32 of the second drive torque. The change rate of the total torque from the time t109 to the time t110 maintains at the ideal change rate z11 as described above.

Figure 5:
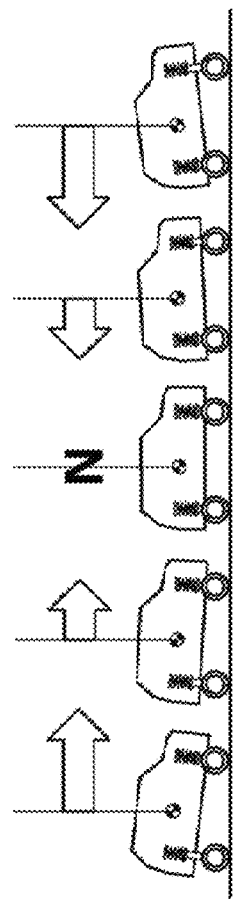
FIG. 5 is a characteristic diagram illustrating a third pattern in which the first drive torque and the second drive torque are controlled and changed by the control unit of the vehicle control device of the embodiment in a case where the drive state of the vehicle changes from the decelerated state to the accelerated state.
Figure 5:
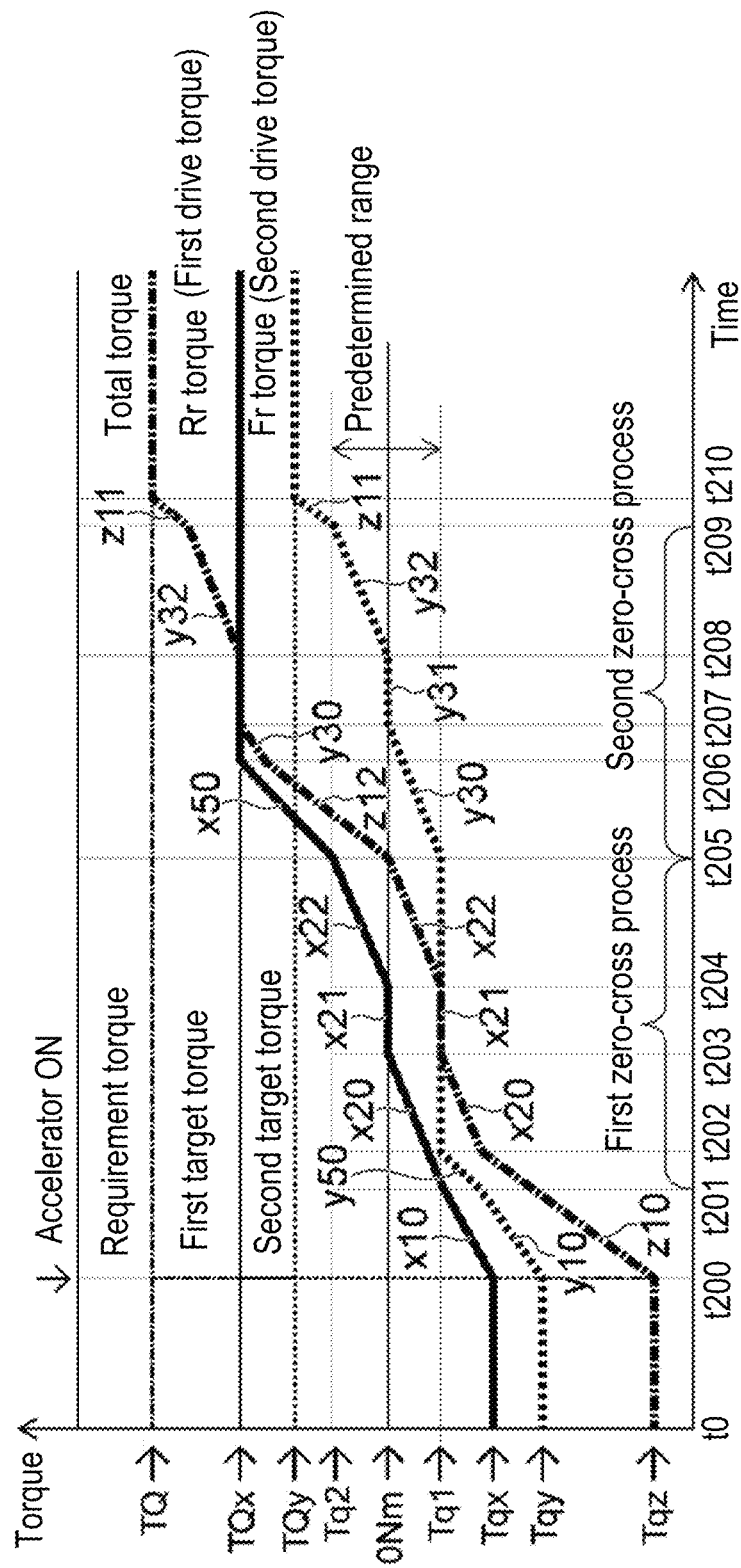

3-3: A third pattern: Next, the details of the control of a third pattern with respect to the first and second drive torque operated by the control unit 100 will be explained with reference to FIG. 5. In FIG. 5, similarly to FIG. 3, the first drive unit 10 outputs the first drive torque to the rear wheels (the left-rear wheel 4, and the right-rear wheel 5 in FIG. 2), and the second drive unit 20 outputs the second torque to the front wheels (the left-front wheel 2, the right-front wheel 3 in FIG. 2)

In the third pattern operated by the control unit 100, basically, the same control as that of the first pattern is operated from a time t200 which is the first time point to a time t205 when the first zero-cross process ends. Thus, the term from the time t200 to the time t205 corresponds to the term from the time t100 to the t105 of the first pattern. In the term from the time t201 to the t202 of the first pattern, the change rate of the second drive torque changes from y10 to y20 in accordance with the change of the change rate of the first drive torque from x10 to x20 to maintain the ideal distribution ratio according to the predetermined map and/or formula of the position control of the vehicle. However, in the second pattern, the calculation unit 120 changes the change rate of the second drive torque from y10 to y50 (y50 is greater than y10) to maintain the change rate of the total torque in the same term while allowing that the ideal distribution ratio is not maintained or while allowing not to maintain the ideal distribution ratio. That is, the change rate of the first drive torque decreased from x10 to x20 by the zero-cross process is offset or compensated by the change rate of the second drive torque to maintain the change rate of the total torque at the ideal change rate z10.

Next, in the third pattern, similarly to the first pattern, when the first drive torque in which the first zero-cross process is operated reaches the second predetermined torque Tq2 at the time t205, the first zero-cross process ends. At the same time, the second zero-cross process is operated (starts) for the second drive torque which is maintained at the first predetermined torque Tq1. Thus, the change rate of the second drive torque changes, at the t205, from zero to y30 (from the time t205 to a time t207), y31(from a time t207 to a time t208, and y32 (from a time t208 to a time t209) (y30 and y32 may be the same value or different values). Similarly to the first pattern, the change rate y30 of the second drive torque from the time t205 to the time t207 may be the same as the change rate x20 of the first drive torque from the time t201 to the time t 203, or different from each other. Further, the change rate y31 of the second drive torque from the time t207 to the time t208 may be the same as the change rete x21 of the first drive torque from the time t203 to the time t 204, or different from each other. Furthermore, the change rate y32 of the second drive torque from the time t208 to the time t209 may be the same as the change rate x22 of the first drive torque from the time t204 to the time t 205, or different from each other.

The second zero-cross process in the third pattern is operated similarly to that of the first pattern between the time t205 to the time t209.

Meanwhile, not similarly to the first pattern (and the second pattern), the first drive torque in which the first zero-cross process ends is controlled to be the change rate x50 so that the change rate of the total torque becomes the ideal change rate z12 from the time t205 when the second zero-cross process is operated with respect to the second drive torque (when the first zero-cross process ends). Specifically, the change rate x50 of the first drive torque after the time t205 is determined with reference to the ideal change rate z12 of the total torque and the change rate y30 of the second drive torque in which the second zero-cross process starts. In this case, the summation of the change rate x50 of the first drive torque and the change rate y30 of the second drive torque is the ideal change rate z12. The ideal change rate z12 of the total torque after the time t205 may be the same as the ideal change rates z10 and z11 of the first pattern, or may be different therefrom.

Next, when the first drive torque reaches the first target torque TQx at the time t206, the calculation unit 120 operate the guard control to make the change rate of the first drive torque zero. As such, in the third pattern, the change rate of the first drive torque is changed to x50 after the time t205 so that the first drive torque may reach the first target torque TQx promptly. Thus, in the third pattern, the torque close to the requirement torque may be applied to the vehicle 1 faster than the first pattern.

When the second zero-cross process ends with respect to the second drive torque at the time t209, the calculation unit 120 controls the second drive unit 20 to increase the second drive torque by the same change rate as the ideal change rate z11 of the total torque. Accordingly, the ideal change rate z11 of the total torque may be maintained from the time t209 to a time 210, and the second drive torque may reach the second target torque TQy promptly.

Finally, the second drive torque reaches the second target torque TQy, and at the same time, the total torque reaches the requirement torque TQ at the time t210. As such, the shift of the drive state of the vehicle 1 from the decelerated state (the first drive state) at the time t200 (the first time point) to the accelerated state (the second drive state) at the time t210 ends. As shown in FIG. 5, the first drive unit 10 and the second drive unit 20 output the first drive torque and the second drive torque, which are negative torque respectively, at the time t200 (the first time point). Meanwhile, the drive state of the vehicle 1 is accelerated state (the second drive state) at the time t210 (the second time point), and as shown in FIG. 5, the first drive unit 10 and the second drive unit 20 output the first drive torque and the second drive torque, which are positive torque, which is the opposite sign to that of the first drive state. The total torque (the requirement torque TQ) at the time t210 is naturally the positive torque.

Figure 6:
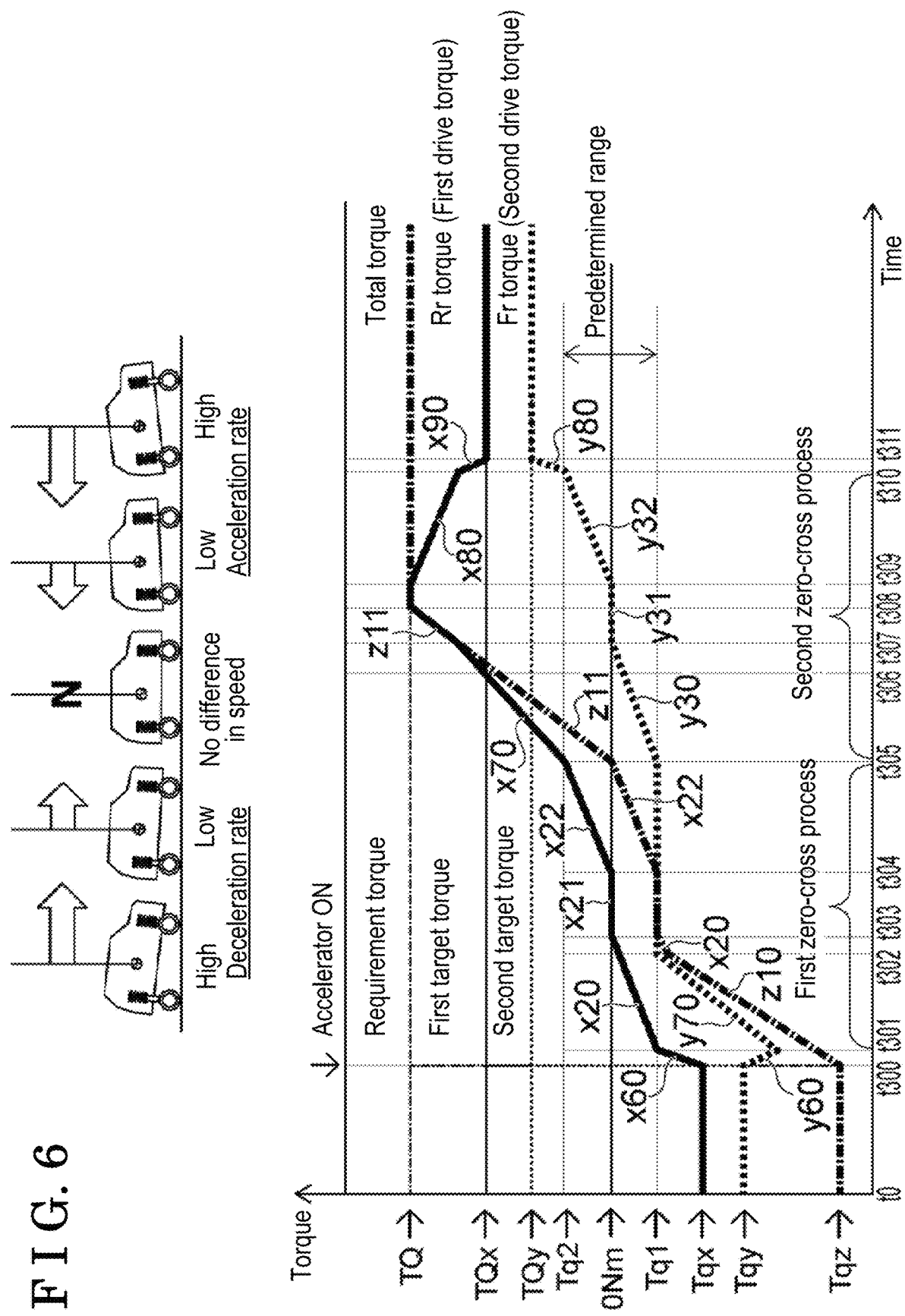
FIG. 6 is a characteristic diagram illustrating a fourth pattern in which the first drive torque and the second drive torque are controlled and changed by the control unit of the vehicle control device of the embodiment in a case where the drive state of the vehicle changes from the decelerated state to the accelerated state.

3-4: A fourth pattern: Next, the details of the control of a fourth pattern with respect to the first and second drive torque operated by the control unit 100 will be explained with reference to FIG. 6. In FIG. 6, similarly to FIG. 3, the first drive unit 10 outputs the first drive torque to the rear wheels (the left-rear wheel 4, and the right-rear wheel 5 in FIG. 2), and the second drive unit 20 outputs the second torque to the front wheels (the left-front wheel 2, the right-front wheel 3 in FIG. 2).

The fourth pattern is a pattern making the total torque reach the requirement torque faster than the first to the third patterns by practically ignoring the ideal distribution ratio of the first drive torque and the second drive torque.

Specifically, at a time t300, when the acceleration operation is operated by the driver and/or the control devices, the calculation unit 120, as explained in the first pattern, calculates the requirement torque TQ based on the information relating to the acceleration opening and the vehicle speed, the value of the first drive torque (Tqx) and the value of the second drive torque 'Tqy) at the time t300. The calculation unit 120 calculates the ideal change rate z10 of the total torque similarly to the first pattern.

Next, as shown in FIG. 6, the calculation unit 120 controls the first drive unit 10 to make the change rate x60 of the first drive torque the upper limit of the performance of the first drive unit 10 to make the first drive torque reach the predetermined torque Tq1 promptly from a time t300 to a time t301 (the second term). Accordingly, the first zero-cross process may be operated (start) promptly with respect to the first drive torque.

Meanwhile, the calculation unit 120 calculates the change rate y60 of the second drive torque with reference to the change rate x60 of the first drive torque and the ideal change rate z10 of the total torque to maintain the ideal change rate z10 of the total torque from the time t300 to the time t301 (the first time point). In this case, as shown in FIG. 6, the change rate y60 of the second drive torque may be the change rate including the opposite sign of the change rate x60 of the first drive torque.

Next, the change rate of the first drive torque changes from x60 to x20 at the time t301 in accordance with the first zero-cross process which starts at the time t301 (the third time point). Here, the calculation unit 120 changes the change rate of the second drive torque from y60 to y70 to maintain the ideal change rate z10 of the total torque from the time t301 to a time t302 (y70 is greater than y60). That is, the change rate of the second drive torque increases from y60 to y70 to offset or compensate the decrease of the change rate of the first drive torque from x60 to x20.

Next, when the second drive torque reaches the first predetermined torque Tq1 at the time t302 during the first zero-cross process respect to the first drive torque, the calculation unit 120 operates the guard control to make the change rate of the second drive torque zero forcibly (to maintain the second drive torque at the first predetermined torqueTq1) so that, similarly to the first pattern, the second zero-cross process is not operated with respect to the second drive torque (so that the second drive torque is not included in the predetermined range).

Next, when the first drive torque in which the first zero-cross process operates reaches the second predetermined torque Tq2 at a time t305, the first zero-cross process ends. At the same time, the calculation unit 120 controls the second drive unit 20 via the output unit 130 to operate (start) the second zero-cross process with respect to the second drive torque maintained at Tq1 by setting the change rate of the second drive torque at y30 (a predetermined value). Thus, the change rate of the second drive torque changes from zero to y30 at (the turning point of) the time t305. The change rate y30 in this case may be the same as the change rate y30 of the first pattern and the second pattern or different therefrom.

Meanwhile, similarly to the second pattern, the first drive torque in which the first zero-cross process ends is controlled to include the change rate in which the change rate of the total torque becomes the ideal change rate z11 from the time t305 (corresponding to the time t205 in the second pattern) when the second zero-cross process is operated with respect to the second drive torque (when the first zero-cross process ends). Specifically, the change rate x70 of the first drive torque after the time t305 is determined with reference to the ideal change rate z11 and the change rate y30 of the second drive torque in which the second zero-cross process starts. In this case, the summation of the change rate x70 of the first drive torque and the change rate y30 of the second drive torque is the ideal change rate z11. The change rate x70 of the first drive torque and the change rate x50 of the first drive torque in the third pattern are the same as long as the change rate y30 of the second drive torque is the same in the third pattern and the fourth pattern.

Next, in the fourth pattern, the guard control is not operated with respect to the first drive torque at the time t206 in the third pattern. Thus, the change rate of the first drive torque is maintained at x70 after the time t306.

Next, in relation to the second zero-cross process operated with respect to the second drive torque, the change rate of the first drive torque changes from x70 to z11 to maintain the ideal change rate z11 of the total torque when the second drive torque is close to zero (0 Nm) and the change rate thereof becomes a smallest value y31 which is close to zero at the time t307.

Accordingly, the total torque reaches the requirement torque TQ at the time t308 during the operation of the second zero-cross process. In this case, the total torque means or is equal to the first drive torque. Accordingly, in the fourth pattern, the total torque may reach the requirement torque faster than the first to third patterns.

After a time t309, the first drive torque is decreased to be converged at the first target torque TQx to correspond to the change rate of the second drive torque in which the second zero-cross is in operation. That is, after the time t309, the calculation unit 120 controls the first drive unit 10 and the second drive unit 20 to offset the change rate y80 of the second drive torque and the change rate x90 of the first drive torque. Finally, at a time t311, the first drive torque reaches the first target torque TQx, and the second drive torque reaches the second target torque TQy at the time t311. Meanwhile, the total torque is maintained at the requirement torque TQ after the time t308.

As such, the shift of the drive state of the vehicle 1 from the decelerated state (the first drive state) at the time t300 (the first time point) to the accelerated state (the second drive state) at the time t311 (the second time point) ends. As shown in FIG. 6, the first drive unit 10 and the second drive unit 20 output the first drive torque and the second drive torque, which are negative torque respectively, at the time t300 (the first time point). Meanwhile, the drive state of the vehicle 1 is accelerated state (the second drive state) at the time t311 (the second time point), and as shown in FIG. 6, the first drive unit 10 and the second drive unit 20 output the first drive torque and the second drive torque, which are positive torque, the opposite sign to that of the first drive state. The total torque (the requirement torque TQ) at the time t311 is naturally the positive torque.

Figure 7:
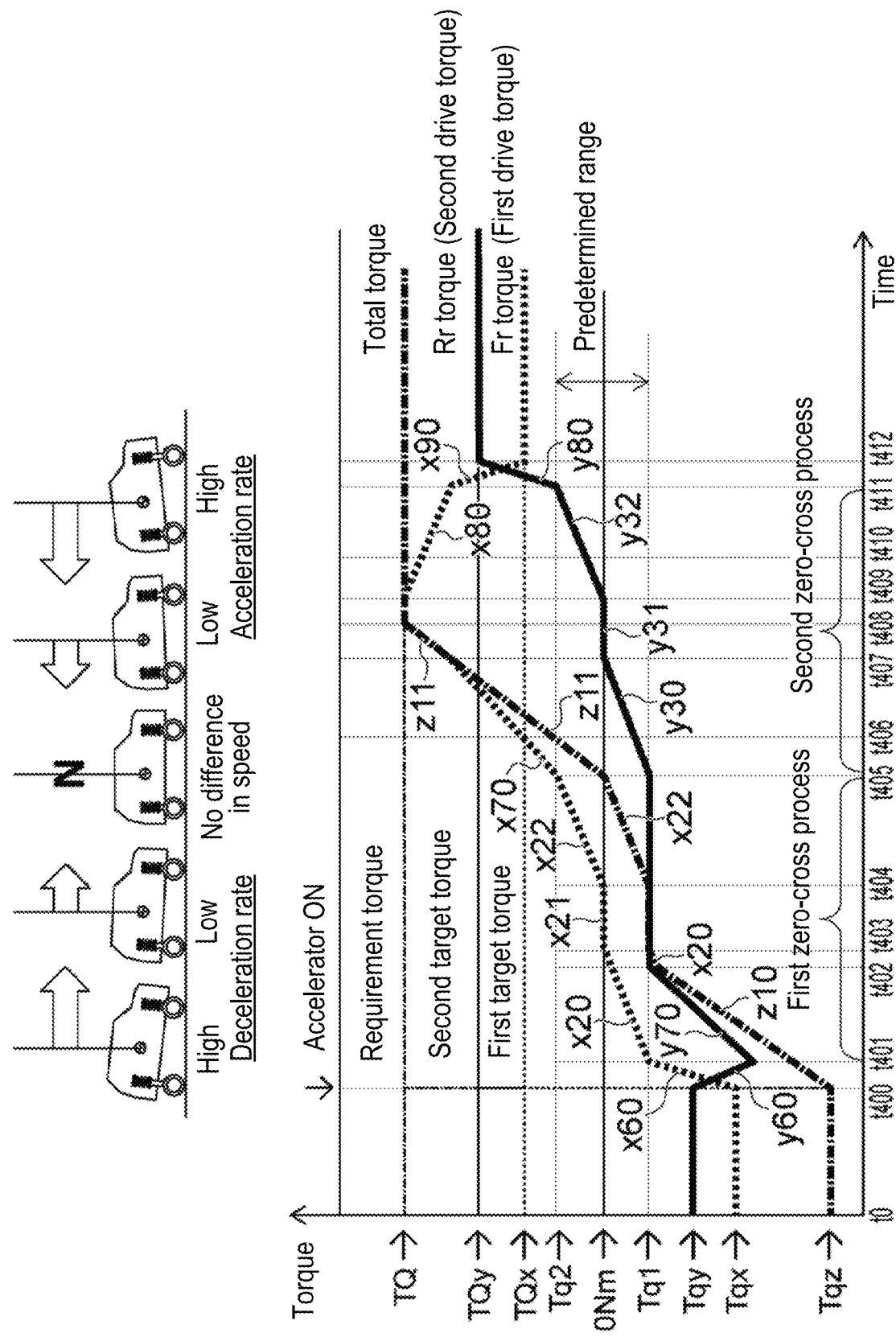
FIG. 7 is a characteristic diagram illustrating a fifth pattern in which the first drive torque and the second drive torque are controlled and changed by the control unit of the vehicle control device of the embodiment in a case where the drive state of the vehicle changes from the decelerated state to the accelerated state.

3-5: A fifth pattern: Next, the details of the control of a fifth pattern with respect to the first and second drive torque operated by the control unit 100 will be explained with reference to FIG. 7. In FIG. 7, not similarly to FIG. 3, the first drive unit 10 outputs the first drive torque to the front wheels (the left-front wheel 2, the right-front wheel 3 in FIG. 2), and the second drive unit 20 outputs the second torque to the rear wheels (the left-rear wheel 4, and the right-rear wheel 5 in FIG. 2).

The control operated in the fifth pattern shown in FIG. 7 is the same as that of the fourth pattern, and the details will not be explained.

However, in the fifth pattern, the first drive torque is away farther from zero (0 zm) than the second drive torque at the first time point (a time t400) which is in the decelerated state (the first drive state). On the other hand, in the first pattern to the fourth pattern, the first drive torque at the first time point (the time t100, the time t200, and the time t300) is closer to zero than the second drive torque. This may be the control pattern for operating the first zero-cross process promptly. This control pattern may make the total torque of the first drive torque and the second drive torque reach the requirement torque promptly by shortening the whole control time until the first and second zero cross processes end.

However, there may be a case where the orientation stability of the vehicle 1 is prior to these objectives (to make the total torque reach the requirement torque promptly by quickly operating the first zero-cross process) depending on the drive state of the vehicle 1. In this case, the fifth pattern is useful.

Figure 8:
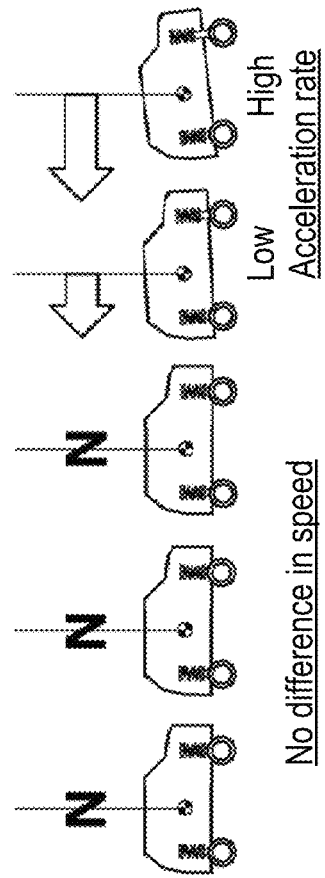
FIG. 8 is a characteristic diagram illustrating a sixth pattern in which the first drive torque and the second drive torque are controlled and changed by the control unit of the vehicle control device of the embodiment in a case where the drive state of the vehicle changes from the decelerated state to the accelerated state.
Figure 8:
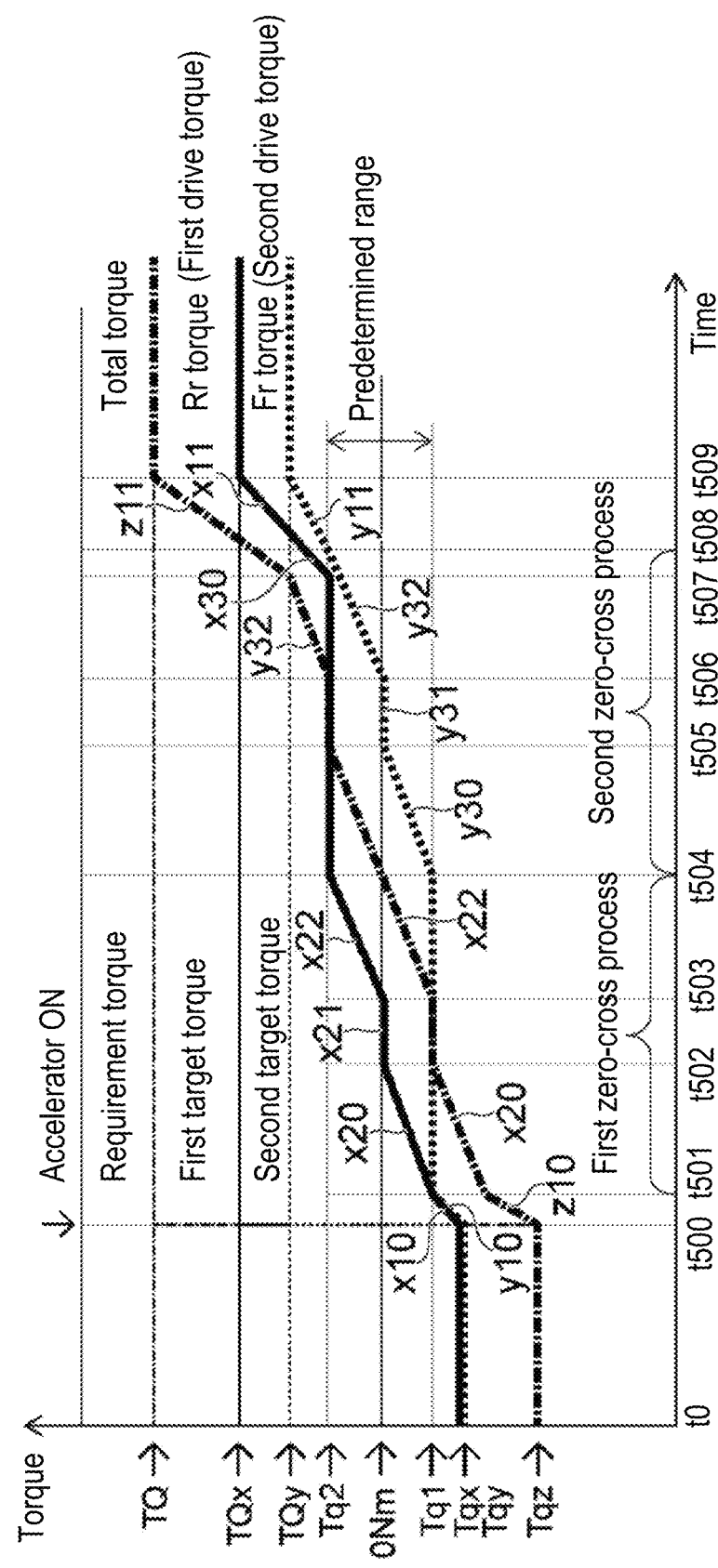
Figure 9:
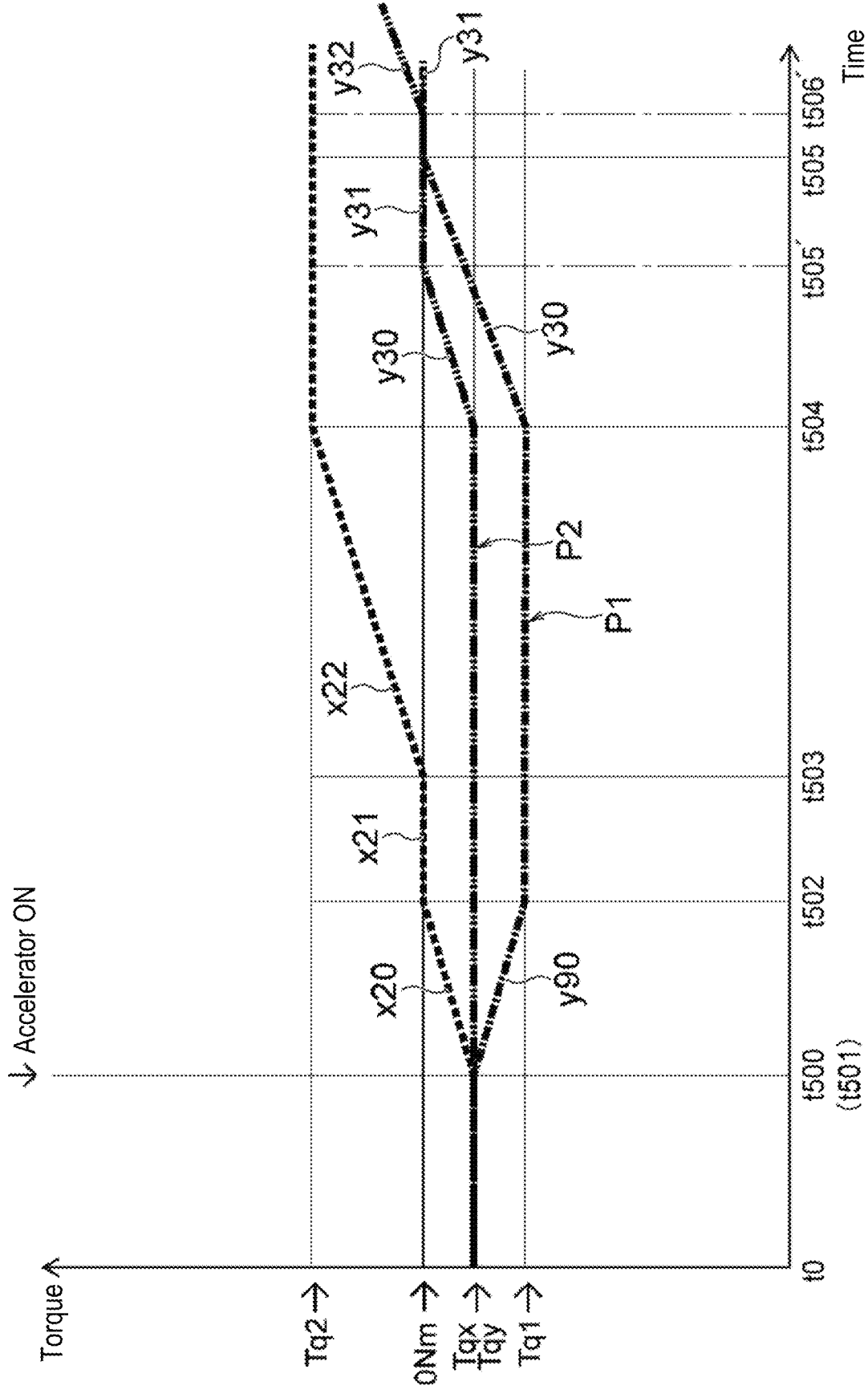
FIG. 9 is a partial characteristic diagram schematically illustrating a derivative pattern of the sixth pattern.

3-6: A sixth pattern: Next, the details of the control of a sixth pattern with respect to the first and second drive torque operated by the control unit 100 will be explained with reference to FIGS. 8 and 9. In FIGS. 8 and 9, similarly to FIG. 3, the first drive unit 10 outputs the first drive torque to the rear wheels (the left-rear wheel 4, and the right-rear wheel 5 in FIG. 2), and the second drive unit 20 outputs the second torque to the front wheels (the left-front wheel 2, the right-front wheel 3 in FIG. 2).

In the sixth pattern shown in FIG. 8, the same control as that of the first pattern is operated, and the details will not be explained.

However, in the sixth pattern, because the vehicle 1 is neither in the accelerated state nor in the decelerated state (the first drive state) at the first time point (a time t500), the first drive torque and the second drive torque are substantially the same at the time t500. In this case, in FIG. 8, similarly to FIG. 3, the first drive unit 10 outputs the first drive torque to the rear wheels, and the first drive torque is applied with the first zero-torque process firstly. Alternatively, the drive unit 10 may output the first drive torque to the front wheels, and the first drive torque may be applied with the first zero-torque process firstly. This control process may be applied to a case where the first drive unit 10 outputs the first drive torque to the left wheels (the left-front wheel 2 and the left-rear wheel 4) and the second drive unit 20 outputs the second drive torque to the right wheels (the right-front wheel 3 and the right-rear wheel 5), a case where the first drive unit 10 outputs the first drive torque to the right wheels (the right-front wheel 3 and the right-rear wheel 5) and the second drive unit 20 outputs the second drive torque to the left wheels (the left-front wheel 2 and the left-rear wheel 4) or for example, a case where the drive state of the vehicle 1 shifts from a rotation decelerated state to a rotation accelerated state. In this case, the control of the sixth pattern may be operated by calculating the torque distribution ratio of the first drive torque and the second drive torque based on, for example, the information relating to the steering angle from the steering sensor 63, the vehicle characteristics, and the torque vectoring requirement (the requirement relating to the degree of assistance of the right and left of the vehicle 1 in accordance with the steering angle).

The sixth pattern explained with reference to FIG. 8 has been explained on the premise that the first drive torque Tqx and the second drive torque Tqy are out of range of the first predetermined torque Tq1 and the second predetermined torque q2, respectively, at the time t500 when the acceleration operation is operated by the driver and/or the control devices. However, there may be a case where the first drive torque Tqx and/or the second drive torque Tqy are within the range of the first predetermined torque Tq1 and the second predetermined torque q2, respectively, at the time t500. This specific control will be explained with reference to FIG. 9.

As shown in FIG. 9, he first drive torque Tqx at the time t500 is within the predetermined range which is the condition of the first zero-cross process, that is, within the range between the first predetermined torque Tq1 and the second predetermined torque Tq2. Thus, the operation performed from the time t500 to the time t501 as in the sixth pattern which was explained with reference to FIG. 8 is not applied (does not have to be operated with respect) to the first drive torque. The first zero-cross process is immediately applied at the time t500, and is operated from the time t500 to the time t504. In FIG. 8, under the circumstances in which the time t501 is defined as the time when the first zero-cross process starts, the time t500 is defined as or is equal to the time t501 in FIG. 9.

Meanwhile, when the first zero-cross process starts with respect to the first drive torque at the time t500, similarly to the case in, for example, FIG. 8, the calculation unit 120 changes the second drive torque Tqy to the first predetermined torque Tq1 via a predetermined change rate y90 at the time t500 to start the second zero-cross process immediately after the end of the first zero-cross process at the time t504 (see P1 in FIG. 9). Alternatively, the calculation unit 120 may maintain the second drive torque Tqy at the time t500 through the time t504 in consideration that the second drive torque Tqy at the time t500 is within the range of the first predetermined torque Tq1 and the second predetermined torque Tq2, the range which is the condition of the second zero-cross process (see P2 in FIG. 9).

The control for the second drive torque relating to P1 in FIG. 9 means that the magnitude of the second drive torque is kept away from zero during the operation of the first zero-cross process, leading to the decrease of vibrations or oscillations occurring in the second drive torque. Meanwhile, in the control relating to P2 in FIG. 9, because the second zero-cross process starts from the magnitude Tqy of the second drive torque, the second zero-cross process may end promptly. Thus, the total torque of the first drive torque and the second drive torque may reach the requirement torque promptly. In FIG. 9, because the first zero-cross process starts from the magnitude Tqx of the first drive torque, the first zero-cross process may end promptly. All things considered, the total torque may reach the requirement torque faster than the case shown in, for example, FIG. 3.

The control for the first drive torque and the second drive torque after the time t504 is generally common with the case shown in FIG. 8, and the details thereof will not be explained.

Figure 10:
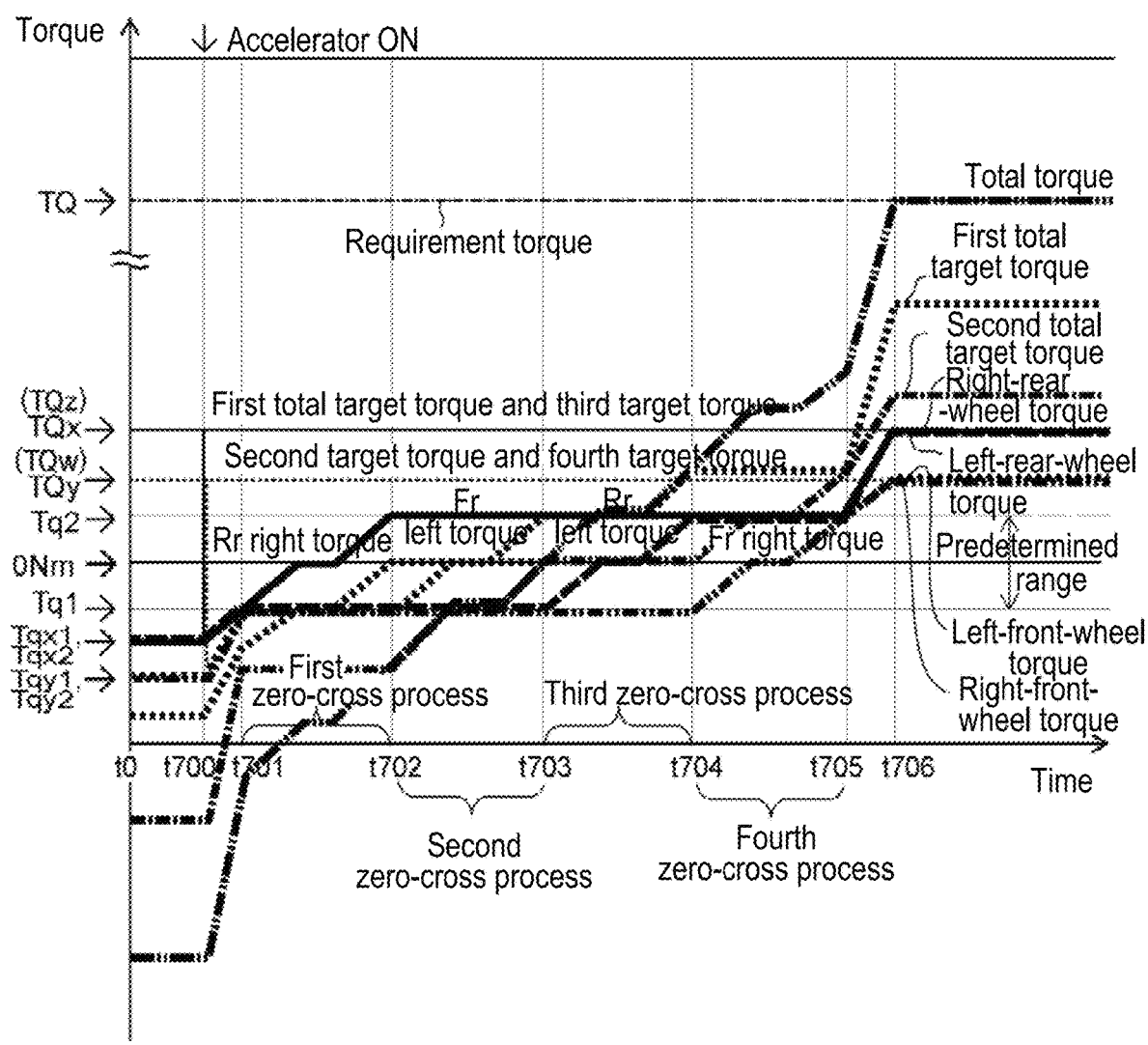
FIG. 10 is a characteristic diagram schematically illustrating a state where the first drive torque, the second drive torque, a third drive torque and a fourth drive torque are controlled and changed by the control unit of the vehicle control device of the embodiment in a case where the drive state of the vehicle changes from the decelerated state to the accelerated state.

3-7: A modified pattern 1: Next, the details of the control of a case where the vehicle 1 is an electric vehicle including four-independent-wheels, or so-called an in-wheel motor type electric vehicle will be explained with reference to FIG. 10. The vehicle 1 includes a third drive unit and a fourth drive unit in addition to the first drive unit 10 and the second drive unit 20, and the control unit 100 controls the first drive torque outputted from the first drive unit 10, the second drive torque outputted from the second drive unit 20, a third drive torque outputted from the third drive unit, and a fourth drive torque outputted from the fourth drive unit. In FIG. 10, the first drive unit 10 outputs the first drive torque to the right-rear wheel (the right-rear wheel 5 in FIG. 2), the second drive unit 20 outputs the second torque to the left-front wheel (the left-front wheel 2 in FIG. 2), the third drive unit outputs the third torque to the left-rear wheel (the left-rear wheel 4 in FIG. 2), and the fourth drive unit outputs the fourth torque to the right-front wheel (the right-front wheel 3 in FIG. 2).

In the modified pattern shown in FIG. 10, similarly to the other patterns, the control unit 100 operates the basic calculation process such as the calculation or the computation of the requirement torque, the first target torque relating to the first drive torque, the second target torque relating to the second drive torque. However, in this modified pattern, the third drive unit outputting the third torque and the fourth drive unit outputting the fourth torque are provided. In particular, after calculating the requirement torque of the total torque, the control unit 100 (the calculation unit 120) calculates a first total target toque relating to a first total torque which is the summation of the first drive torque and the third drive torque outputting the drive torque to the rear wheels based on the aforementioned formulas 1 to 4. Similarly, the control unit 100 calculates a second total target toque relating to a second total torque which is the summation of the second drive torque and the fourth drive torque outputting the drive torque to the front wheels. The summation of the first total torque and the second total torque is the total torque, and the summation of the first total target torque and the second total target torque is the requirement torque.

Next, the calculation unit 120 calculates the first target torque TQx relating to the first drive torque and a third target torque TQz relating to the third drive torque based on a predetermined distribution ratio from the first total target torque calculated as above. Here, the predetermined distribution ratio is calculated based on the predetermined map or formula based on, for example, the steering angle at the first time point (a time t700 in FIG. 10) (the distribution ratio is 50% and 50% in FIG. 10 for convenience). As shown in FIG. 10, the modified pattern 1 is on the assumption that the steering angle is zero (straight forward) at the time t700, and the magnitude of the first target torque TQx and the third target torque TQz is the same. Similarly, the first drive torque Tqx1 and the third drive torque Tqx2 are the same at the time t700.

Similarly, the calculation unit 120 calculates the second target torque TQy relating to the second drive torque and the fourth target torque TQw relating to the fourth drive torque based on the predetermined distribution ratio from the second total target torque calculated as above. Here, the predetermined distribution ratio is calculated based on the predetermined map or formula based on, for example, the steering angle at the first time point (the time t700 in FIG. 10) (the distribution ratio is 50% and 50% in FIG. 10 for convenience). As shown in FIG. 10, the modified pattern 1 on the assumption that the steering angle is zero (straight forward) at the time t700, and the magnitude of the second target torque TQy and the fourth target torque TQw is the same. Similarly, the second drive torque Tqy1 and the fourth drive torque Tqy2 are the same at the time t700.

The calculation unit 120 calculates the ideal change rate of the total torque which is the summation of the first to the fourth drive torque. The calculation method of the ideal change rate in the modified pattern 1 is the same as the aforementioned calculation method.

Next, the calculation unit 120 controls the first to the fourth drive torque based on the ideal change rate of the calculated requirement torque, the first target torque to the fourth target torque, and the total torque. The specific control method is basically the same as the aforementioned first pattern.

In particular, as shown in FIG. 10, the first zero-cross process is operated with respect to the first drive torque (a time t701 to a time t702), the second zero-cross process is operated with respect to the second drive torque (a time t702 to a time t703), the third zero-cross process is operated with respect to the third drive torque (a time t703 to a time t704), and the fourth zero-cross process is operated with respect to the fourth drive torque (a time t704 to a time t705). The second drive torque to the fourth drive torque are maintained at the first predetermined torque Tq1 during the first zero-cross process, and accordingly, the first zero-cross process to the fourth zero-cross process are effectively operated in order without wasting the time. In the time t700 to the time t701, and the time t705 to the time t706, the values of the first drive torque to the fourth drive torque increase by the change rate in which the ideal change rate is maintained.

In consideration of the occurrence of yaw to the vehicle 1 in response to the right-and-left balance of the torque, for example, the vehicle 1 may be exclusively provided with a known device configured to control the position or posture of the vehicle 1 by automatically cancelling the yaw by the modification of the steering angle, for example, a steer-by-wire device.

Figure 11:
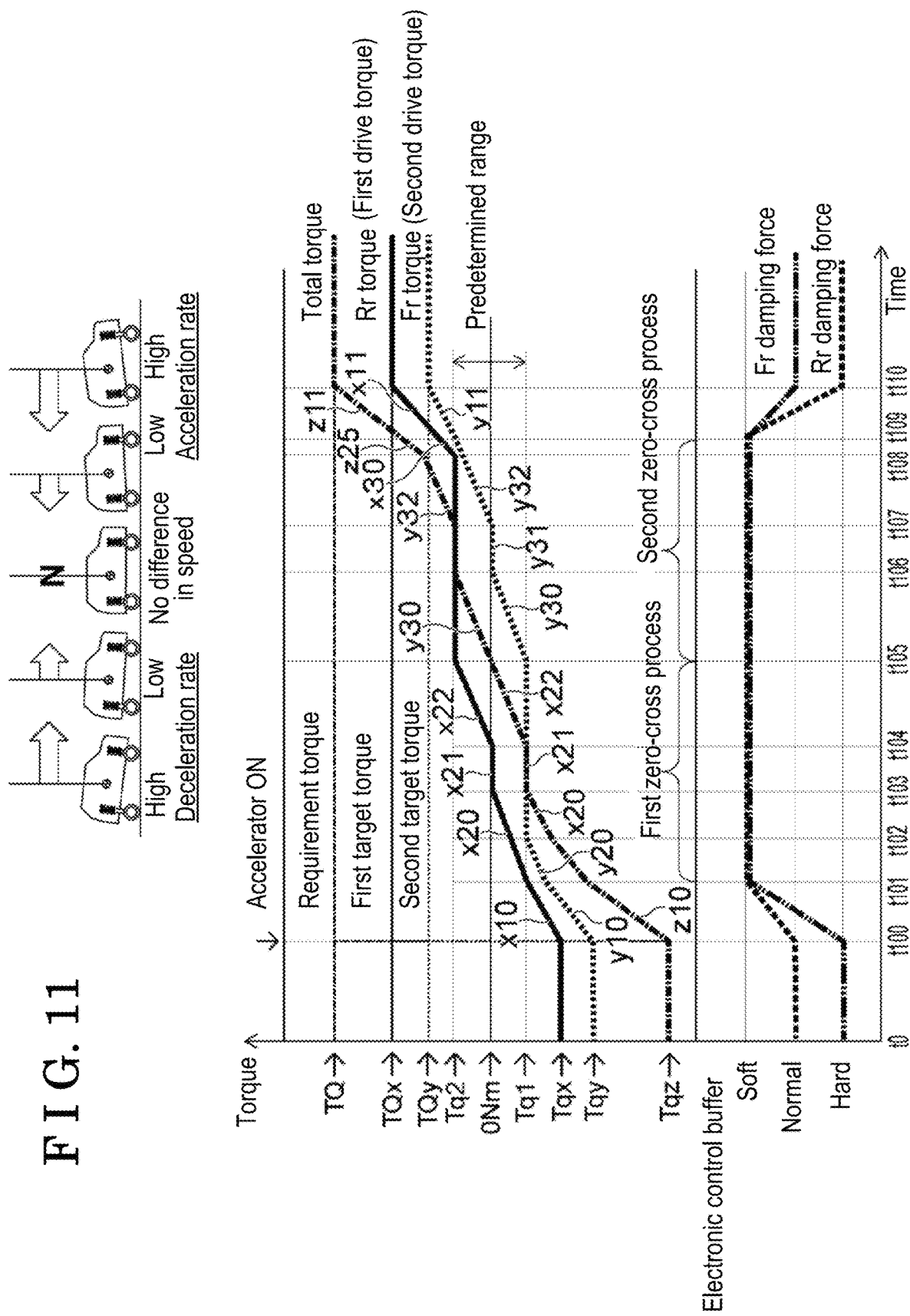
FIG. 11 is a characteristic diagram schematically illustrating a state in which the first pattern illustrated in FIG. 3 is combined with the control with respect to an electronic control buffer.
Figure 12:
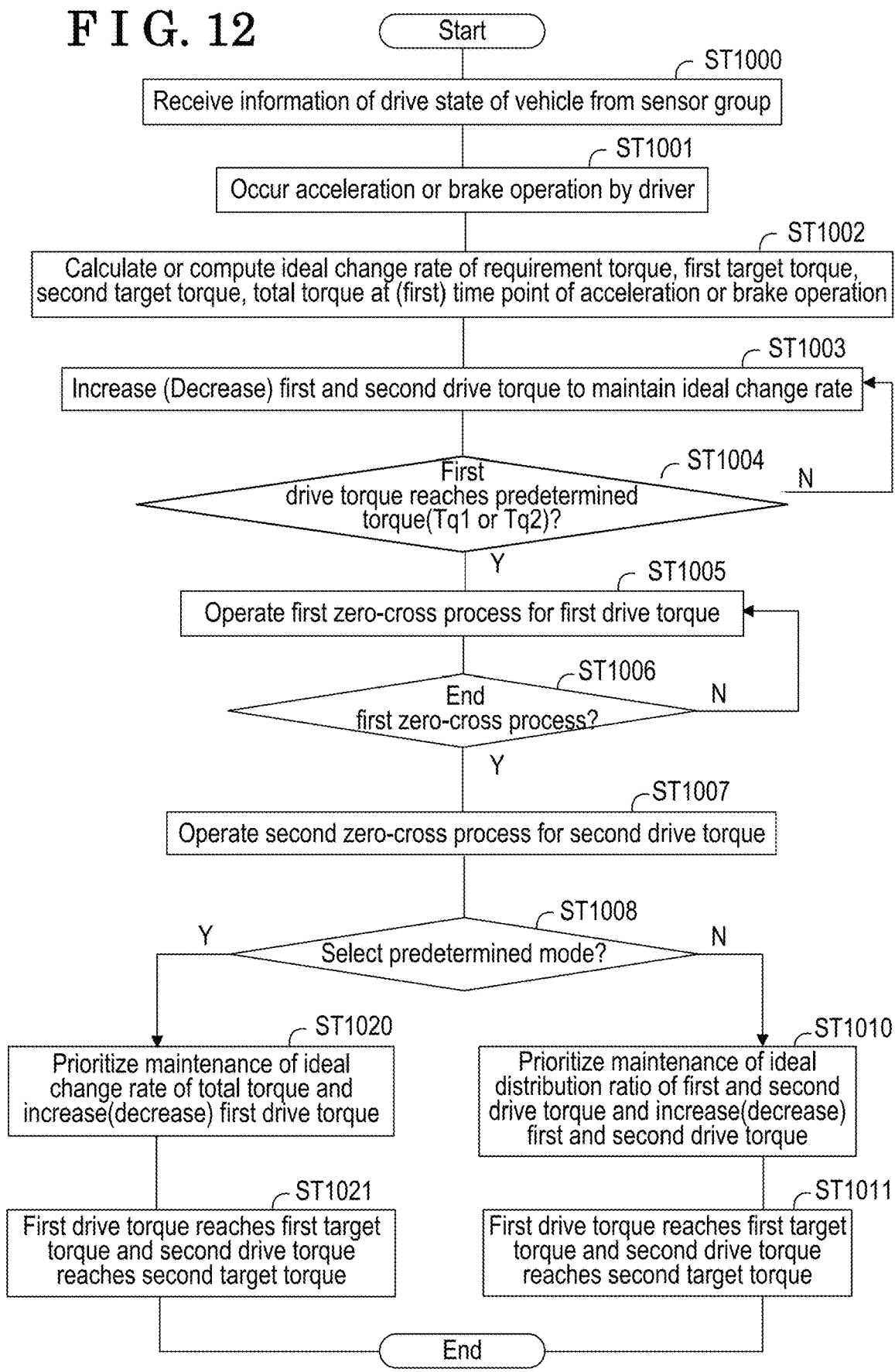
FIG. 12 a flow chart illustrating an example of an operation performed by the control unit of the vehicle control device of the embodiment.

3-8: A modified pattern 2: Next, the details of a case where the control of the first pattern with respect to the first drive torque and the second drive torque operated by the control unit 100 is combined with a control with respect to an electronic control buffer 50 will be explained with reference to FIG. 11. In FIG. 11, similarly to FIG. 3, the first drive unit 10 outputs the first drive torque to the rear wheels (the left-rear wheel 4, and the right-rear wheel 5 in FIG. 2), and the second drive unit 20 outputs the second torque to the front wheels (the left-front wheel 2, the right-front wheel 3 in FIG. 2).

The control of the modified pattern 2 is the same as that of the first pattern, and the details will not be explained. The control with respect to the electronic control buffer 50 will be explained.

The control unit (the calculation unit 120) controls the damping force of the rear wheel (Rr damping force in FIG. 11) and the damping force of the front wheel (Fr damping force in FIG. 11) with respect to the electronic control buffer 50 in response to or in accordance with control commands against the first drive unit 10 and the second drive unit 20 (for example, control commands relating to the first and second zero-cross processes). In particular, as shown in FIG. 11, the calculation unit 120 controls the Rr damping force and the Fr damping force during the first and second zero-cross processes, that is, from the time t101 to the time t109 to be greater than the other time (the time t100 to the time t101, and the time t109 to the time t110). By controlling the electronic control buffer 50, the first and second zero-cross processes may end promptly by the electronic control buffer 50 which buffers (absorbs) disturbances even the disturbances such as vibration or oscillation in response to the change of the road surface during the first and second zero-cross processes.

4. The flow of the control operation by the control unit: Next, the flow of the operation by the control unit 100 will hereunder be explained.

The control unit 100 receives various information relating to the drive state of the vehicle 1 from the sensor group such as accelerator sensor 60 via a receiver 110 in Step ST1000. It is favorable that the control unit 100 continually receives various information relating to the drive state of the vehicle 1 from the sensor group.

Next, when the acceleration operation or the brake operation by the driver and/or the control devices, the operation informed via the accelerator sensor 60 or the brake sensor 61, is operated in ST1001, the control unit 100 (the calculation unit 120) calculates or computes the ideal change rate z10 (z11, z12) of the requirement torque RQ, the first target torque TQx, the second target torque TQy, and the total torque at the time point in which the acceleration operation or the brake operation is performed (corresponding to the first time point and the time t100 in FIG. 3) in ST1002. Strictly speaking of ST1002, the control unit 100 (the calculation unit 120) firstly calculates the requirement torque TQ, and secondly calculates the ideal change rate z10 (z11, z12) of the total torque based on the information relating to the acceleration opening, the information relating to the vehicle speed, the values of the first drive torque and the second drive torque at the time point in which the accelerator pedal is operated by the driver and/or the control devices. The control unit 100 thirdly calculates the first target torque TQx and, subsequently, the second target torque TQy ideally distributed based on the requirement torque TQ.

Next, in ST1003, the control unit 100 (the calculation unit 120) increases (decreases) the first drive torque and the second drive torque from the first time point to maintain the ideal change rate z1 of the total torque calculated in ST1002. Here, the increase rate (or the decrease rate) of the first drive torque in ST1003 may be controlled as that of the aforementioned third pattern based on such as the characteristics of the vehicle 1 and the drive state of the vehicle 1 at the first time point. Alternatively, the control operation may exclusively include a process for selecting the first pattern or the third pattern based on the drive state of the vehicle 1 at the first time point on the control flow.

Next, the control unit 100 (the calculation unit 120) determines whether the first drive torque reaches the predetermined torque (corresponding to the first predetermine torque Tq1 or the second predetermined torque Tq2 in FIG. 3, for example) in ST1004. In a case where the control unit 100 (the calculation unit 120) does not determine that the first drive torque reaches the predetermined torque (NO in ST1004), the process goes back to ST1003.

In a case of determining that the first drive torque reaches the predetermined torque (YES in ST1004), the control unit 100 (the calculation unit 120) operates (starts) the first zero-cross process with respect to the first drive torque. During the first zero-cross process with respect to the first drive torque, the control unit 100 (the calculation unit 120) controls the second drive unit 20 to maintain the second drive torque at the predetermined torque after increasing the same thereto.

Next, the control unit 100 (the calculation unit 120) determines whether the first zero-cross process ends in ST1006. When the control unit 100 (the calculation unit 120) determines that the first zero-cross process is in operation (NO in ST1006), the process goes back to ST1005.

In case of determining that the first zero-cross process ends (YES in ST1006), the control unit 100 (the calculation unit 120) operates (starts) the second zero-cross process with respect to the second drive torque.

Next, the control unit 100 (the calculation unit 120) refers to the information relating to the drive mode of the vehicle 1 among the various information relating to the drive state of the vehicle 1 received from the sensor group. For example, in a case where the vehicle 1 includes a normal mode and a power mode (of which the output torque when the vehicle 1 moves is set greater than the normal mode) which are appropriately switchable by the driver, the calculation unit 120 determines whether the power mode is selected in ST1008.

In the case where the normal mode is selected (NO in ST1008), the process goes back to ST1010. In this case, the control unit 100 (the calculation unit 120) increases the first drive torque and the second drive torque to prioritize the maintenance of the aforementioned ideal distribution ratio (the ideal distribution ratio with respect to the first drive torque and the ideal distribution ratio with respect to the second drive torque on the position control of the vehicle) as the basic control thought. That is, the control unit 100 controls the first drive torque and the second drive torque as described in the first pattern explained with reference to FIG. 3 and the sixth pattern explained with reference to FIG. 8.

In ST1011, the control ends when the first drive torque reaches the first target torque TQx and the second drive torque reaches the second target torque TQy (and the total torque reaches the requirement torque TQ).

On the other hand, in a case where the power mode is selected in ST1008 (YES in ST1008), the process goes to ST1020. In this case, the control unit 100 (the calculation unit 120) increases (decreases) the first drive torque and the second drive torque to prioritize the maintenance of change rate of the total torque at the aforementioned ideal distribution ratio. That is, the control unit 100 controls the first drive torque and the second drive torque as described in the third pattern explained with reference to FIG. 5, the fourth pattern with reference to FIG. 6, and the fifth pattern explained with reference to FIG. 7.

In ST1021, the control ends when the first drive torque reaches the first target torque TQx and the second drive torque reaches the second target torque TQy (and the total torque reaches the requirement torque TQ).

Meanwhile, the control operation by the control unit 100 is described as above. However, the process of ST1008 is not necessarily required, and in a case where the characteristics of the vehicle 1 is set at the power mode continually (that is, the vehicle 1 does not include the function in which the driver may select the normal mode or the power mode), the control unit 100 mounted on the vehicle 1 is not provided with the processes of ST1010 and ST1011, and is adapted with the control method in accordance with a pattern (for example, the third pattern) corresponding to the so-called power mode. On the other hand, in a case where the characteristics of the vehicle 1 is set at the normal mode continually (that is, the vehicle 1 does not include the function in which the driver may select the normal mode or the power mode), the control unit 100 mounted on the vehicle 1 is not provided with the processes of ST1020 and ST1021, and is adapted with the control method in accordance with a pattern (for example, the first pattern) corresponding to the so-called normal mode.

In the modified pattern 1, the control unit 100 of the vehicle control device 500 operates the process similarly to the flow of the aforementioned example of the operation. However, in ST1002, the control unit 100 calculates the additional values, such as the third target torque TQz and the fourth target torque TQw in addition to the first target toque TQx and the second target torque TQy, to accord with the modified pattern 1.

The aforementioned embodiment described above are examples. Particularly, FIGS. 3 to 11 illustrate the shift from the decelerated state or the no-speed state (the first drive state) to the accelerated state (the second drive state). Alternatively, there may be a case where the shift is established from the accelerated state (the first drive state) to the decelerated state (the second drive state).

According to the aforementioned embodiment, the vehicle control device 500 includes a first drive unit 10 configured to output a first drive torque Tqx, Tqx1 to a first drive wheel, a second drive unit 20 configured to output a second drive torque Tqy, Tqy1 to a second drive wheel, and a control unit configured to obtain information relating to a drive state of a vehicle 1 from a sensor group including at least an accelerator sensor 60 and a brake sensor 61, calculate a requirement torque TQ required by a driver of the vehicle 1 based on the obtained information relating to the drive state of the vehicle 1, compute, after the calculation of the requirement torque TQ, a first target torque TQx relating to the first drive torque Tqx, Tqx1 distributed based on the requirement torque TQ, a second target torque TQy relating to the second drive torque Tqy, Tqy1 distributed based on the requirement torque TQ, and an ideal change rate z10, z11, z12, z20, z25, z30, z40, z50, z60, z70, z80 of a total torque Tqz of the first drive torque Tqx, Tqx1 and the second drive torque Tqy, Tqy1 in a first term from a first time point in which the driver performs an operation relating to an accelerator or a brake to a second time point in which the total torque Tqz reaches the requirement torque TQ, and at least control a magnitude of the first drive torque Tqx, Tqx1 outputted from the first drive unit 10 in the first term and a magnitude of the second drive torque Tqy, Tqy1 outputted from the second drive unit 20 in the first term. In a case where the drive state of the vehicle 1 shifts from a first drive state to a second drive state, the first drive state where the first drive torque Tqx, Tqx1 and the second drive torque Tqy, Tqy1 including a same sign of one of positivity and negativity are outputted at the first time point, the second drive state where the first drive torque Tqx, Tqx1 including an opposite sign of the first drive torque Tqx, Tqx1 in the first drive state and reaching the first target torque TQx and the second torque including the opposite sign of the second drive torque Tqy, Tqy1 in the first drive state and reaching the second target torque TQy are outputted at the second time point, the control unit 100 is configured to control the first drive unit 10 to operate a first zero-cross process which makes a change rate of the first drive torque Tqx, Tqx1 be equal to or smaller than a predetermined value in a case where the first drive torque Tqx, Tqx1 is within a predetermined range including zero when the negativity and the positivity of the first drive torque Tqx, Tqx1 switches through zero, and control the second drive unit 20 to operate a second zero-cross process after the first zero-cross process ends, the second-zero process which makes a change rate of the second drive torque Tqy, Tqy1 be equal to or smaller than the predetermined value in a case where the second drive torque Tqy, Tqy1 is within the predetermined range when the negativity and the positivity of the second drive torque Tqy, Tqy1 switches through zero.

According to the aforementioned configuration, the vehicle control device 500 may operate the first and second zero-cross processes in the different timing. Thus, the timing when the occurrence of noises and vibrations (oscillations) in accordance with the torque change of the first drive torque Tqx, Tqx1 decreased by the first zero-cross process and the timing when the occurrence of noises and vibrations (oscillations) in accordance with the torque change of the second drive torque Tqy, Tqy1 decreased by the second zero-cross process may be set different from each other. The occurrence of noises and vibrations (oscillations) may be effectively reduced as a whole of the vehicle control device 500.

According to the aforementioned embodiment, the predetermined range is between a first predetermined torque Tq1 set at a negative side and a second predetermined torque Tq2 set at a positive side.

According to the aforementioned configuration, the first and second zero-cross processes may be securely operated.

According to the aforementioned embodiment, the first drive torque Tq1 in the first drive state is closer to zero than the second drive torque.

According to the aforementioned configuration, the first zero-cross process may be operated promptly while efficiently reducing the occurrence of noises and vibrations (oscillations) as a whole of the vehicle control device 500. Thus, the whole control time until the first and second zero-cross processes end may be shortened and the total torque Tqz of the first and second drive torque may reach the requirement torque TQ promptly.

According to the aforementioned embodiment, the control unit 100 is configured to control the second drive unit 20 to inhibit the second drive torque from being included in the predetermined range during the first zero-cross process.

According to the aforementioned configuration, the first and second zero-cross processes may be inhibited from being operated at substantially the same time.

According to the aforementioned embodiment, the control unit 100 is configured to estimate a fourth time point in which the first zero-cross process ends by at least referring to the predetermined value relating to the change rate x20, x21, x22 of the first drive torque Tqx at a third time point in which the first zero-cross process starts, and control the second drive unit 20 to change the second drive torque from the third time point to make the second drive torque be an absolute value of one of the first predetermined torque Tq1 and the second predetermined torque Tq2 at the fourth time point.

According to the aforementioned configuration, the second zero-cross process may be operated immediately after the end of the first zero-cross process while efficiently reducing the occurrence of noises and vibrations (oscillations) as a whole of the vehicle control device 500. Thus, the whole control time until the first and second zero-cross processes end may be further shortened and the total torque Tqz of the first and second drive torque may reach the requirement torque TQ promptly.

According to the aforementioned embodiment, the control unit 100 is configured to control the first drive unit 10 to make the change rate x60 of the first drive torque Tqx be an upper limit in the second term from the first time point to a third time point in which the first zero-cross process starts.

According to the aforementioned configuration, the first zero-cross process may be operated even faster while efficiently reducing the occurrence of noises and vibrations (oscillations) as a whole of the vehicle control device 500. Thus, the whole control time until the first and second zero-cross processes end may be further shortened and the total torque Tqz of the first and second drive torque may reach the requirement torque TQ promptly.

According to the aforementioned embodiment, the control unit 100 is configured to control the second drive unit 20 to change the second drive torque in the second term by a change rate calculated by referring to the change rate x60 of the first drive torque Tqx and the ideal change rate z10 in the second term.

According to the aforementioned configuration, the ideal change rate z10 of the total torque Tqz may be maintained in the second term. Accordingly, the total torque Tqz of the first and second drive torque may reach the requirement torque TQ promptly.

According to the aforementioned embodiment, the control unit 100 is configured to control the first drive unit 10 to change the first drive torque Tqx at least in a part of the term from a fourth time point in which the first zero-cross process ends to the second time point by a change rate calculated by referring to the ideal change rate z11, z12 and the change rate y30, y31, y32 of the second drive torque during the second zero-cross process.

According to the aforementioned configuration, the ideal change rate z12 of the total torque Tqz may be maintained at least at a part of the term from the fourth time point to the second time point. Accordingly, the total torque Tqz of the first and second drive torque may reach the requirement torque TQ promptly.

According to the aforementioned embodiment, in a third term when the first zero-cross process and the second zero-cross process are in operation, damping force of an electronic control buffer mounted on the vehicle 1 is set greater than damping force in a term other than the third term.

According to the aforementioned configuration, even the disturbances such as vibrations or oscillations occur in response to the change of the road surface during the first and second zero-cross processes, the electronic control buffer 50 buffers (absorbs) disturbances, and accordingly, the first and second zero-cross processes may end promptly.

According to the aforementioned embodiment, the first drive wheel is one of a front wheel 2, 3 and a rear wheel 4, 5, and the second drive wheel is the other of the front wheel 2, 3 and the rear wheel 4, 5.

According to the aforementioned configuration, the vehicle control device 500 may be used at various circumstances.

According to the aforementioned embodiment, the first drive wheel is one of a right wheel 3, 5 and a left wheel 2, 4, and the second drive wheel is the other of the right wheel 3, 5 and the left wheel 2, 4.

According to the aforementioned configuration, the vehicle control device 500 may be used at various circumstances.

According to the aforementioned embodiment, the vehicle control device 500 may efficiently reduce noises and vibrations (oscillations).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle control device, comprising:
   a first drive unit configured to output a first drive torque to a first drive wheel;
   a second drive unit configured to output a second drive torque to a second drive wheel; and
   a control unit configured to
     obtain information relating to a drive state of a vehicle from a sensor group including at least an accelerator sensor and a brake sensor;
     calculate a requirement torque required by a driver of the vehicle based on the obtained information relating to the drive state of the vehicle;
     compute, after the calculation of the requirement torque;
       a first target torque relating to the first drive torque distributed based on the requirement torque,
       a second target torque relating to the second drive torque distributed based on the requirement torque, and
       an ideal change rate of a total torque of the first drive torque and the second drive torque in a first term from a first time point in which the driver performs an acceleration operation or a brake operation to a second time point in which the total torque reaches the requirement torque; and
     at least control a magnitude of the first drive torque outputted from the first drive unit in the first term and a magnitude of the second drive torque outputted from the second drive unit in the first term, wherein
   in a case where the drive state of the vehicle shifts from a first drive state to a second drive state, the first drive state where the first drive torque and the second drive torque including a same sign of one of positivity and negativity are outputted at the first time point, the second drive state where the first drive torque including an opposite sign of the first drive torque in the first drive state and reaching the first target torque and the second torque including the opposite sign of the second drive torque in the first drive state and reaching the second target torque are outputted at the second time point,
   the control unit is configured to
   control the first drive unit to operate a first zero-cross process which makes a change rate of the first drive torque be equal to or smaller than a predetermined value in a case where the first drive torque is within a predetermined range including zero when the negativity and the positivity of the first drive torque switches through zero; and
   control the second drive unit to operate a second zero-cross process after the first zero-cross process ends, the second-zero process which makes a change rate of the second drive torque be equal to or smaller than the predetermined value in a case where the second drive torque is within the predetermined range when the negativity and the positivity of the second drive torque switches through zero.

2. The vehicle control device according to claim 1, wherein the predetermined range is between a first predetermined torque set at a negative side and a second predetermined torque set at a positive side.

3. The vehicle control device according to claim 1, wherein the first drive torque in the first drive state is closer to zero than the second drive torque.

4. The vehicle control device according to claim 1, wherein the control unit is configured to control the second drive unit to inhibit the second drive torque from being included in the predetermined range during the first zero-cross process.

5. The vehicle control device according to claim 2, wherein the control unit is configured to
   estimate a fourth time point in which the first zero-cross process ends by at least referring to the predetermined value relating to the change rate of the first drive torque at a third time point in which the first zero-cross process starts, and
   control the second drive unit to change the second drive torque from the third time point to make the second drive torque be an absolute value of one of the first predetermined torque and the second predetermined torque at the fourth time point.

6. The vehicle control device according to claim 1, wherein the control unit is configured to control the first drive unit to make the change rate of the first drive torque be an upper limit in a second term from the first time point to a third time point in which the first zero-cross process starts.

7. The vehicle control device according to claim 6, wherein the control unit is configured to control the second drive unit to change the second drive torque in the second term by a change rate calculated by referring to the change rate of the first drive torque and the ideal change rate in the second term.

8. The vehicle control device according to claim 1, wherein the control unit is configured to control the first drive unit to change the first drive torque at least in a part of a term from a fourth time point in which the first zero-cross process ends to the second time point by a change rate calculated by referring to the ideal change rate and the change rate of the second drive torque during the second zero-cross process.

9. The vehicle control device according to claim 1, wherein, in a third term when the first zero-cross process and the second zero-cross process are in operation, damping force of an electronic control buffer mounted on the vehicle is set greater than damping force in a term other than the third term.

10. The vehicle control device according to claim 1, wherein the first drive wheel is one of a front wheel and a rear wheel, and the second drive wheel is the other of the front wheel and the rear wheel.

11. The vehicle control device according to claim 1, wherein, the first drive wheel is one of a right wheel and a left wheel, and the second drive wheel is the other of the right wheel and the left wheel.

* * * * *